(12) United States Patent
Nelson et al.

(10) Patent No.: US 7,020,708 B2
(45) Date of Patent: Mar. 28, 2006

(54) AIRCRAFT DATA SERVICES

(75) Inventors: Eric A. Nelson, Bellevue, WA (US); Michael B. O'Meara, Seattle, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 819 days.

(21) Appl. No.: 09/884,730

(22) Filed: Jun. 19, 2001

(65) Prior Publication Data
US 2003/0055975 A1 Mar. 20, 2003

Related U.S. Application Data

(63) Continuation-in-part of application No. 09/312,011, filed on May 14, 1999, now Pat. No. 6,760,778.

(51) Int. Cl.
*G06F 15/16* (2006.01)

(52) U.S. Cl. ........................ 709/230; 709/246; 455/431

(58) Field of Classification Search ................ 709/230, 709/246; 455/430, 431, 463
See application file for complete search history.

(56) References Cited

U.S. PATENT DOCUMENTS

| | | | |
|---|---|---|---|
| 5,381,140 A | 1/1995 | Kuroda et al. | |
| 5,412,660 A * | 5/1995 | Chen et al. | ................. 370/318 |
| 5,438,610 A | 8/1995 | Bhagat et al. | |
| 5,448,768 A | 9/1995 | Zinser | |
| 5,459,469 A | 10/1995 | Schuchman et al. | |
| 5,557,656 A | 9/1996 | Ray et al. | |
| 5,627,546 A | 5/1997 | Crow | |
| 5,657,032 A | 8/1997 | Liechty et al. | |
| 5,714,948 A | 2/1998 | Farmakis et al. | |
| 5,798,726 A | 8/1998 | Schuchman et al. | |
| 5,887,258 A | 3/1999 | Lemozit et al. | |
| 5,890,079 A | 3/1999 | Levine | |
| 5,974,349 A | 10/1999 | Levine | |
| 5,990,928 A | 11/1999 | Sklar et al. | |
| 6,014,606 A * | 1/2000 | Tu | ............................ 701/200 |
| 6,088,717 A * | 7/2000 | Reed et al. | ................. 709/227 |
| 6,173,159 B1 | 1/2001 | Wright et al. | ................. 455/66 |
| 6,181,990 B1 * | 1/2001 | Grabowsky et al. | ........ 455/431 |
| 6,249,913 B1 * | 6/2001 | Galipeau et al. | .............. 725/76 |
| 6,477,152 B1 * | 11/2002 | Hiett | .......................... 370/316 |
| 6,646,998 B1 * | 11/2003 | Rasanen | ...................... 370/328 |
| 6,675,208 B1 * | 1/2004 | Rai et al. | .................... 709/224 |

FOREIGN PATENT DOCUMENTS

| | | |
|---|---|---|
| EP | 0 890 907 | 1/1999 |
| WO | WO 96/03846 | 2/1996 |
| WO | WO 00/14987 | 3/2000 |

* cited by examiner

*Primary Examiner*—Jeffrey Pwu
(74) *Attorney, Agent, or Firm*—Kenyon & Kenyon LLP

(57) ABSTRACT

A method and system provide efficient, flexible, and convenient data communication services over public wireless systems. The system includes a data communication server, having a plurality of interface units, for facilitating data communication between a moving object and one or more ground terminals via a radio communication path. The data communication server establishes the radio communication path over one of a plurality of wireless data networks including packet data networks and satellite data networks and preferably includes a pre-determined software architecture.

21 Claims, 17 Drawing Sheets

AIRCRAFT DATA SERVICES

CROSS REFERENCE TO RELATED APPLICATIONS

This application is a continuation-in-part of U.S. patent application Ser. No. 09/312,011 filed May 14, 1999 now U.S. Pat. No. 6,760,778, entitled "Method and Apparatus for Data Communication Utilizing the North American Terrestrial System". This application is related to U.S. application entitled "Aircraft Data Communications Services for Users", which is filed on even date herewith. These applications are commonly assigned.

BACKGROUND OF THE INVENTION

1. Field of the Invention

The present invention generally relates to wireless data communication services. It particularly relates to aircraft data communication services.

2. Background

Existing data communication services, particularly for aircraft systems, are generally limited by particular (non-public) communication protocols, systems, and applications. These particular protocols include the Aircraft Communication Addressing and Reporting System (ACARS), which is an aircraft communication protocol limited to safety and operations data and confined to particular hardware/software systems. Another limited, non-public system is the Air Traffic Control Radar Beacon System (ATCRBS), which provides surveillance data to air traffic controllers. The particular applications provided by non-public communication systems include ground flight recorder development, air traffic control operations, maintenance operations, position monitoring (e.g., global position satellite systems—GPS systems), collision avoidance, aircraft surveillance, weather radar, in-flight entertainment and other specific applications.

Existing data communication services for aircraft passengers are similarly limited to particular communication protocols and software/hardware systems, therein limiting convenience, affordability, and efficiency. These user communication protocols and systems include the Terrestrial Flight Telephone System (TFTS) and other private communication protocols and systems. These private systems require specialized, high-cost antenna equipment and power control systems or an inconvenient, invasive passenger ID assignment system to make use of public communication systems such as the cellular communication system or the public switched telephone network (PSTN), or require high-interference systems such as the existing amplitude modulation (AM) aircraft communication systems. Based on these existing limitations of non-public communication systems, a need exists to enable flexible, seamless data communication for aircraft systems using public wireless networks to increase affordability and efficiency.

SUMMARY OF THE INVENTION

The previously mentioned disadvantages are overcome by providing an efficient, flexible, and convenient method and system for providing data communication services. In accordance with embodiments of the present invention, a data communication server, including a plurality of interface units, facilitates data communication between a moving object and one or more ground terminals via a radio communication path. The data communication server establishes the radio communication path over one of a plurality of wireless data networks including terrestrial and satellite data networks and may include an object-oriented software architecture. Additional features of the present invention include personal data communication services for users and operational data services for the moving object.

Additional features of the present invention include a system for providing communication services including a data communication server, co-located with a moving object, for establishing a radio communication path between a moving object and a ground station, the data communication server including software architecture including software functional layers.

Further features of the present invention include a method of providing wireless data communication services including establishing a radio communication path between a moving object and a first ground station using a communication server co-located with the moving object, and communicating with a second ground station via the first ground station.

DETAILED DESCRIPTION

System Components

Figure 1:
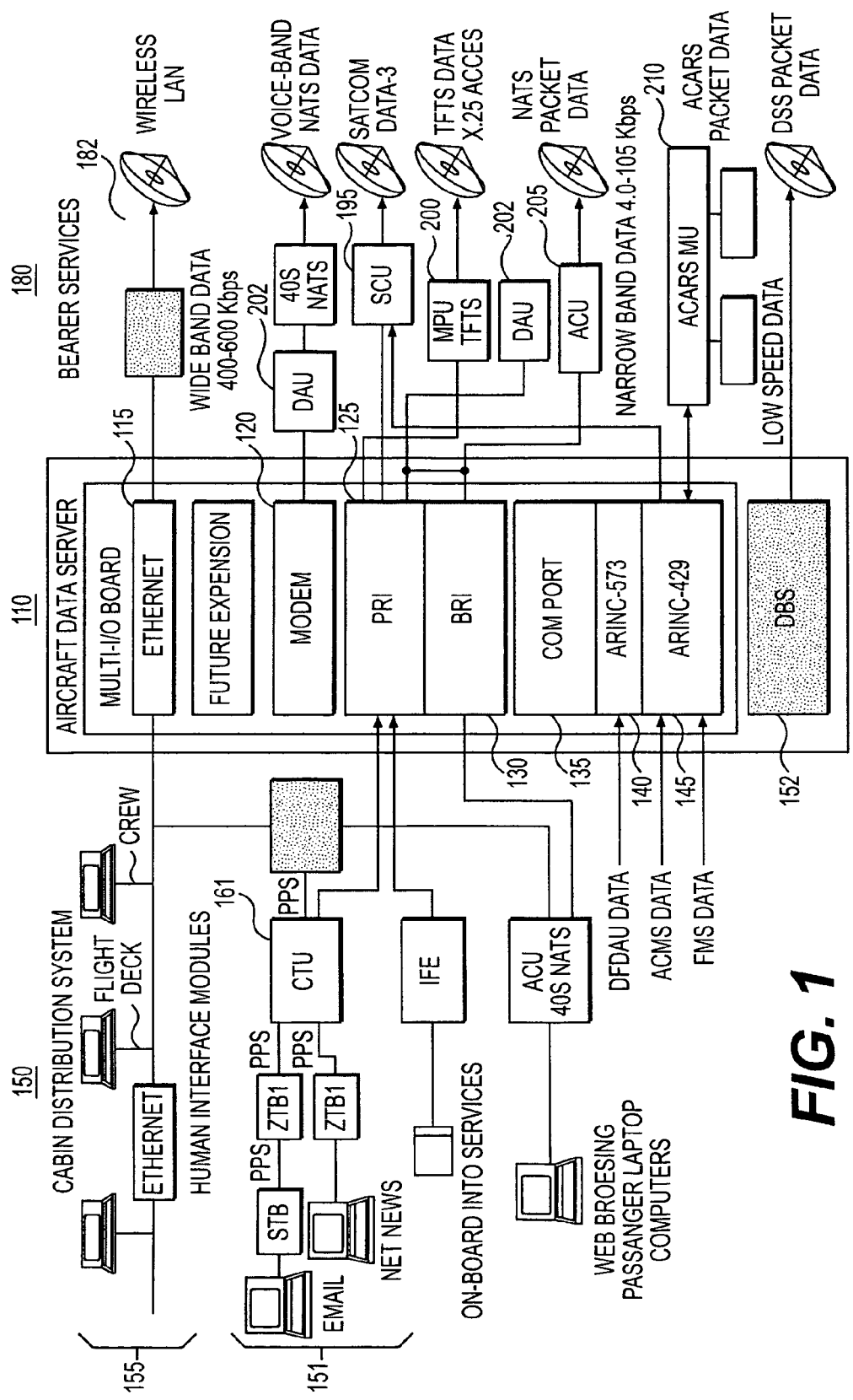
FIG. 1 is a block diagram showing a communication system architecture in accordance with an embodiment of the present invention.

FIG. 1 illustrates a representative data communication system architecture 100 in accordance with embodiments of the present invention. The system 100 includes an aircraft data server 110, cabin distribution system (CDS) 150, and bearer services system components 180. The server 110 may be used as the main processor unit that provides programmable control over the routing, scheduling, and use of the system 100.

The CDS 150 provides access to the data services provided by the system 100 via the server 110. The CDS may include a plurality of components including a Human Interface Module (HIM) 155, a Passenger Access Server (PAS) or Terminal Server (TS) (not shown), and other components known to those of skill in the art for forming a Cabin Communications System (CCS). The HIMs 155 may be laptop computers with applications for logging data and interfacing with the server for data transfers. The PAS/TS, which may advantageously be a part of the server 110 or an external device, can provide dial-up connectivity to the passenger seats for data service access.

The bearer services system components 180 can provide the server 110 with the data connectivity to a plurality of ground-based servers. The bearer services system components 180 may include a plurality of components including an Airborne Communications Unit (ACU) 205, a Wireless Gate-link system (WGS) 182, a Satellite Data Unit (SDU) 195, and a Terrestrial Flight Telephone system (TFTS) 200. The WGS 182 may be, for example, a wireless LAN transceiver (as shown in FIG. 1) based on the IEEE 802.11 specifications which can allow transfer of high-speed data to the server 110 in the airport when the aircraft (moving object) is on the ground. The ACU may act as the gateway to a ground-based data center via the North American Terrestrial System (NATS) network. Although the present invention is described with reference to the NATS network, the NATS network is solely exemplary and alternative communication networks may be used for providing air-to-ground data communication services.

The SDU may provide access a Satellite Communications (SATCOM) Satellite Bearer Service. The TFTS is used to access the European land-line telephone network.

System 100 may include a plurality of components to provide higher data bandwidth and passenger access technology for facilitating data applications, examples being Internet Web browsing and email retrieval. These components include Direct Broadcast Service (DBS) satellite decoder 152, passenger cabin dial-up access system 151, and the WGS 182. Other components of system 100 can help facilitate data communications over the existing NATS data network.

The server 110 may include a CPU (not shown) comprising, for example, an Intel Pentium Pro, or equivalent processor system. The CPU provides multiple functions including, for example, interfacing various applications for data storage and retrieval, and managing various data communications interfaces for data transfer to the ground-based servers.

The server 110 may include a plurality of interface units for interconnecting to various data networks. These interface units may comprise a plurality of discrete I/O boards or a single integrated board. Alternatively, the server 110 may include commercial off-the-shelf (COTS) network cards to provide data communications services for the system 100.

The plurality of interface (I/O) units may include an Ethernet interface unit 115, modem 120, communications (COM) port 135, Integrated Services Digital Network (ISDN) Basic Rate Interface (BRI) port 130, Primary Rate Interface (PRI) port 125, ARINC-429 (Aeronautical Radio, Inc.) bus interface unit 145, and ARINC-573 bus interface unit 140. The Ethernet unit 115 may include ports for interconnection to the HIMs 155 and to the external terminal station (TS), and may be used to connect to the wireless local area network (LAN) transceiver 182 providing a high-speed data path to ground terminals while the aircraft (moving object) is on the ground. Alternatively, a COTS Ethernet card attaching to an external hub (not shown) may be used.

The modem 120 and COM port 135 are used to enable the server 110 to provide dial-up connection to the ground-based servers via the NATS network. Additionally, in the packet data mode for system 100, the COM port 135 can be used to connect the server 110 to the ACU 205 directly.

The PRI port 125 and BRI port 130 allow users (passengers) to establish dial-up internet protocol (IP) connections, via the CDS 150, when the system 100 offers Web browsing, email retrieval, and other passenger-related data services. The BRI port 130 may also be used as one of the system 100 link options when operated in the packet data mode. This mode is entered when a call is established between the server 110 and the ACU 205, and the bearer channel (B-channel) is operated in 64-Kbps unrestricted mode. Once the call setup is completed, data is transferred without alteration allowing data-link protocols, an example being Point-to-Point Protocol (PPP, RFC-1548), to be used to encapsulate the IP packets sent to and from the ACU. This mode may also be referred to as the transparent bearer service.

The ARINC-429 bus interface 145 can be used by the server 110 to receive data from a plurality of on-board management systems and to allow access to an additional bearer service via the existing Aircraft Communications Addressing and Reporting System (ACARS) messaging capabilities or Satellite Data Unit (SDU) if so chosen. The server 110 can also receive data transmitted from the ground via ACARS using the interface 145. Advantageously, the interface 145 has at least one transmit port to interface with an ACARS mobile unit (MU) 210 and at least two receive ports, one to receive management data from the Aircraft Condition Monitoring Systems (ACMS) and one to receive data from the ACARS. Additional receiving ports can be added as need to provide further management applications to monitor data from on-board sensors via the ARINC-429 bus interface 145.

Additionally, the system 100 may include a digital satellite system (DSS) interface unit (not shown) to provide broadband packet data service at faster rates than an T1/E1 rate. The broadband data service can use a Direct Broadcast Satellite (DBS) to transmit and receive packet data, including a DSS channel coding scheme, quadrature phase shift keying (QPSK) modulation and R-S forward error correction, MPEG-2 technology for compressing and transporting (data link layer) the digital video data, and low-profile antenna and DSS decoder PC board/box to receive and decode the DSS signal. Other broadband methodologies may include, but are not limited to MPEG-4 (e.g, H.263, H.261) and other compression techniques including compression techniques that are standards compliant or proprietary.

The ACU 205 enables air-to-ground communication using the existing NATS network. Advantageously, two types of ACU can be used based on the type of interface to the CDS 150, examples being a type 496 and a type 4300/8600. Type 496 has 12 ISDN BRI ports that support direct interface to BRI handsets, and type 4300/8600 interfaces to the CDS 150 by connecting to the Cabin Telecommunications Unit (CTU) 161 via ISDN PRI port 125. The data link to the ACU 205 may be via one of the B channels on the same PRI that carries voice traffic to the ACU 205 requiring the server 110 to request a B-channel call to the ACU 205 via the CTU 161.

Both types of ACU can include a baseband unit (BBU), radio frequency unit (RFU), and a power supply unit (PSU). The BBU advantageously controls the data link connection from the aircraft to the nearest ground station. Both types of ACU will accept two different data link connection types from the server. In the non-packet data mode, an asynchronous (Async) voice-grade modem dial-up via a B-channel ISDN link using a data access unit (DAU) 202 can be used. In the packet data mode, a transparent B-channel data link can be used.

In the non-packet data mode, the link operates with the BBU having an internal modem to provide V.32/V.22 capability interfacing with the modem on the server 110. In the packet data mode, the server 110 can first encapsulate the IP packet in a PPP data frame and send it to the BBU using the clear B channel data service. Once the BBU receives the PPP frame, the BBU will strip off the PPP header from the PPP packet, and repackage the remaining IP packets into the radio (RF) framing structure. The server 110 then modulates the data with phase shift keying (PSK) and up-converts the signal to radio frequency for the RFU to transmit to the ground. The RFU provides needed signal amplification for transmitted and received signals, and the PSU provides direct current (DC) power derived from the aircraft (moving object) power source.

The Human Interface Modules (HIMs) 155 can be laptop PCs, for example, used by crew and operational personnel as the gateway to the system applications via a standard graphical user interface (GUI). HIMs 155 can be housed, for example, in an adapter shell that allows connection to a common docking station, the adapter shell providing the interface between the HIM 155 and the docking station and equipped with an Ethernet interface to connect to the server 110.

System Data Link Interface Options

Figure 2:
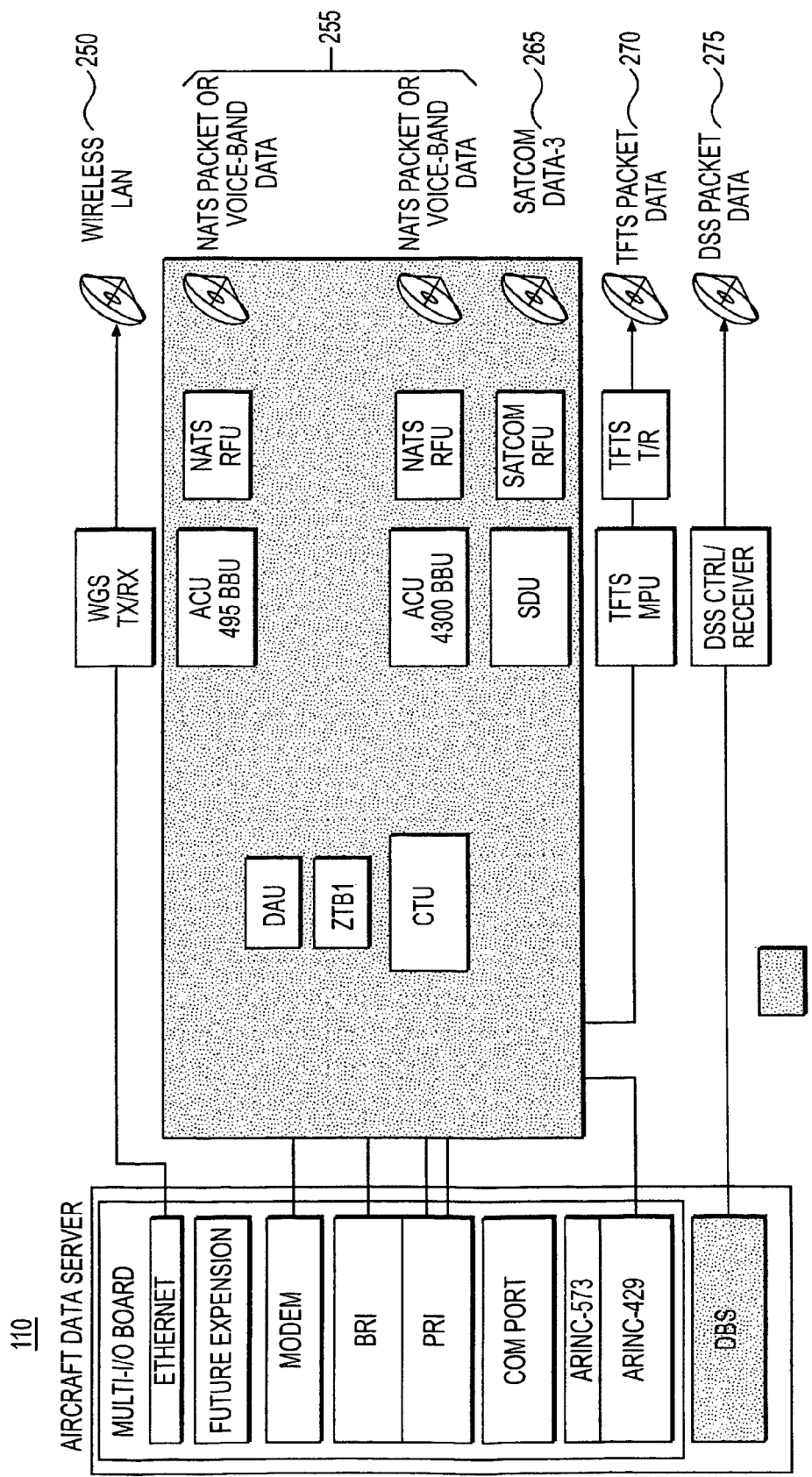
FIG. 2 is a block diagram of an alternative communication system architecture in accordance with an embodiment of the present invention.

The communication system, including server 110, has access to ground-based data servers via several data bearer services as illustrated in FIG. 2. These data bearer services can include wireless LAN services 250, NATS packet or voice-band data services 255, satellite data services 265, terrestrial flight telephone services (TFTS) 270, and direct satellite system services (DSS) 275.

Figure 3:
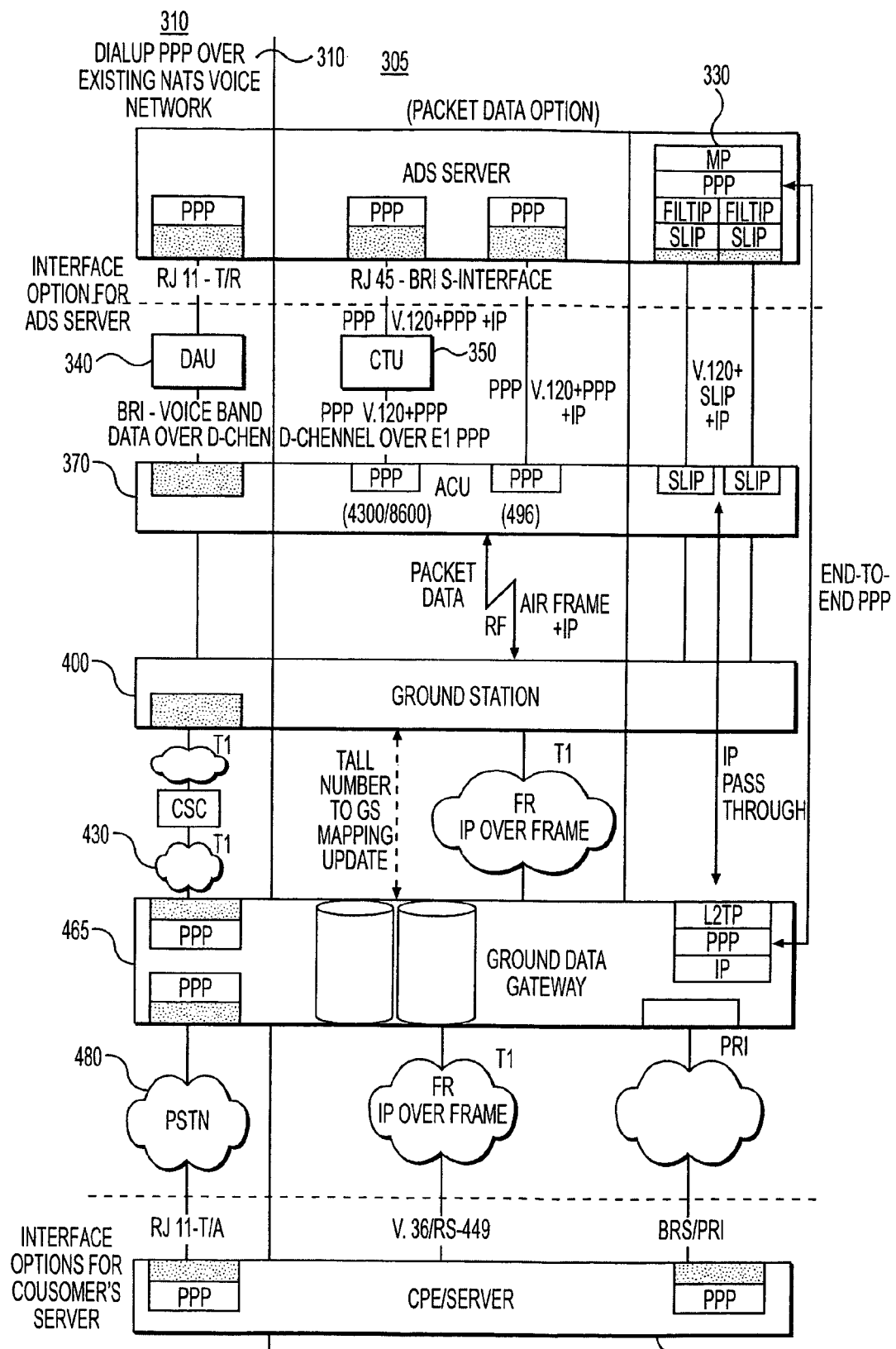
FIG. 3 is a block diagram showing the data link options in accordance with an embodiment of the present invention.

FIG. 3 illustrates the data link options for the server and for the ground-based customer premises equipment (CPE) using the NATS network. Advantageously, there are three data link options for the server 325 to connect to the ACU for providing data communication services to the ground.

The first option is establishing a point-to-point protocol (PPP) connection 310 between the server 325 and the CPE 492 via a voice-grade dial-up over the existing NATS voice network. Other components of the data link may include a data access unit (DAU) 340, ACU 370, ground station 400, public switched telephone network (PSTN) 430, 480, and ground data gateway (GDG) 465. The system can use PPP as the end-to-end link layer protocol as if a direct connection exists between the server and the CPE.

The other two options operate in the packet data mode. A regular traffic channel of the NATS network will be used to carry the packetized data and a circuit switch call is performed to maintain the channel for the duration of the packet transfer. The first packet mode option 310 uses the ISDN BRI interface unit of the server 325 by connecting the server 325 to the type 496-BBU, part of ACU 370, via the BRI line. To establish a radio communication path, the server 325 can send a call setup request message to the 496-BBU, and the 496-BBU can request the ground station for a traffic channel before the 496-BBU establishes the call with the server 325. After a channel is allocated, the 496-BBU returns a call-establish-message back to the server 325, and an end-to-end ISDN data call is established between the server 325 and the 496-BBU. Subsequently, IP packets are transferred using the B channel by encapsulating them inside the PPP frame.

The second packet data option 305 uses ACU 370 of type 4300/8600. In this option, the server 325 is connected to the 4300/8600-BBU via the CTU 350 using the ISDN E1 PRI link. The call setup then follows a similar scenario as to the first packet data option that used BRI except that the CTU 350 is used to establish the call to the BBU, part of ACU 370, over one of the B-channels. At the BBU, IP data packets are channel encoded and encapsulated in radio frequency (RF) data frames. Subsequently, the data packets are modulated onto a radio frequency and sent to the Ground Station (GS) 400. At the GS 400, the data packets are sent along to the Ground Data Gateway (GDG) 465 via a Frame Relay (FR) network. The GDG 465 advantageously transfers the IP packets to different networks by proper protocol conversions, and receives all ground-to-air packet data call requests, sending them to the destination air terminal via an associated GS where a radio link is established by the air terminal.

Additionally, an alternative system architecture 330 can be used for a packet data mode allowing aggregation of multiple radio links to provide higher data throughput. This higher data rate can be achieved by tunneling the PPP frame from the server 325 to GDG 465 via a Layer Two Tunneling Protocol (L2TP). L2TP tunneling allows the PPP session to be initiated by the server 325 and terminated at the GDG 465, not the BBU (part of ACU 370), allowing the server 325 and GDG 465 to establish multiple PPP sessions over multiple radio links. The GDG 465 enables the server 325 to negotiate a PPP Multilink Protocol (MP) with GDG to bundle all the PPP sessions together to form a higher bandwidth virtual pipe.

Also, during operation, the radio communication path between the server 325 and the GDG 456 may be shared by voice and data traffic where the data traffic is interleaved over the voice traffic and inserted, via data frames, into existing voice traffic channels when silence is detected on the existing voice traffic channels.

Tunneling (L2TP) provides a number of unique advantages for the system. These advantages include using the existing infrastructure to make the addition of server data communication services transparent to the existing Air-Ground network until the IP packet arrives at the GDG.

Further advantages include the following: 1) lower development costs because development is only needed at the two ends, server and GDG, and the existing serial line internet protocol (SLIP) on the BBU can be used for delivering L2TP packets; 2) allowing single point of processing for IP address assignment and packet filtering because only the GDG will be used to maintain databases; 3) allowing end-to-end recovery and flow control which therefore removes the need for the BBU to perform buffering and link layer maintenance; 4) allowing aggregation of multiple radio links to increase throughput using MP; 5) allowing future development of new PPP extensions without requiring changes to the BBU/GS because the radio network just passes the packets through the GS; 6) enabling tunneling interfaces with other bearer services, allowing all communications to occur between the server and the GDG independent of the bearer service selected.

For the CPE 492, three data link options can be selected depending on the type of data mode to be used. For a voice-grade data link, the CPE 492 can interface to the system via a V-series modem connected to a two-wire analog line from the LEC (local exchange carrier). For packet data mode, the CPE 492 has two options. For a first packet data mode option, the CPE 492 can use a frame relay service if the CPE is part of an already existing frame network. Advantageously, a permanent virtual circuit (PVC) from each GS to a NATS data gateway over the existing frame network can be established to deliver IP packets from the aircraft (moving object). The CPE can act as a router connecting to the system with the server behind it, or alternatively the server can terminate the frame relay service and IP is transmitted over the link. For the second packet data mode option which provides lower costs, ISDN BRI service is obtained from the local exchange carrier (LEC). When IP packets are destined to the CPE, the GDG will set up the data link dynamically by calling to the CPE using PPP for IP encapsulation.

Figure 4:
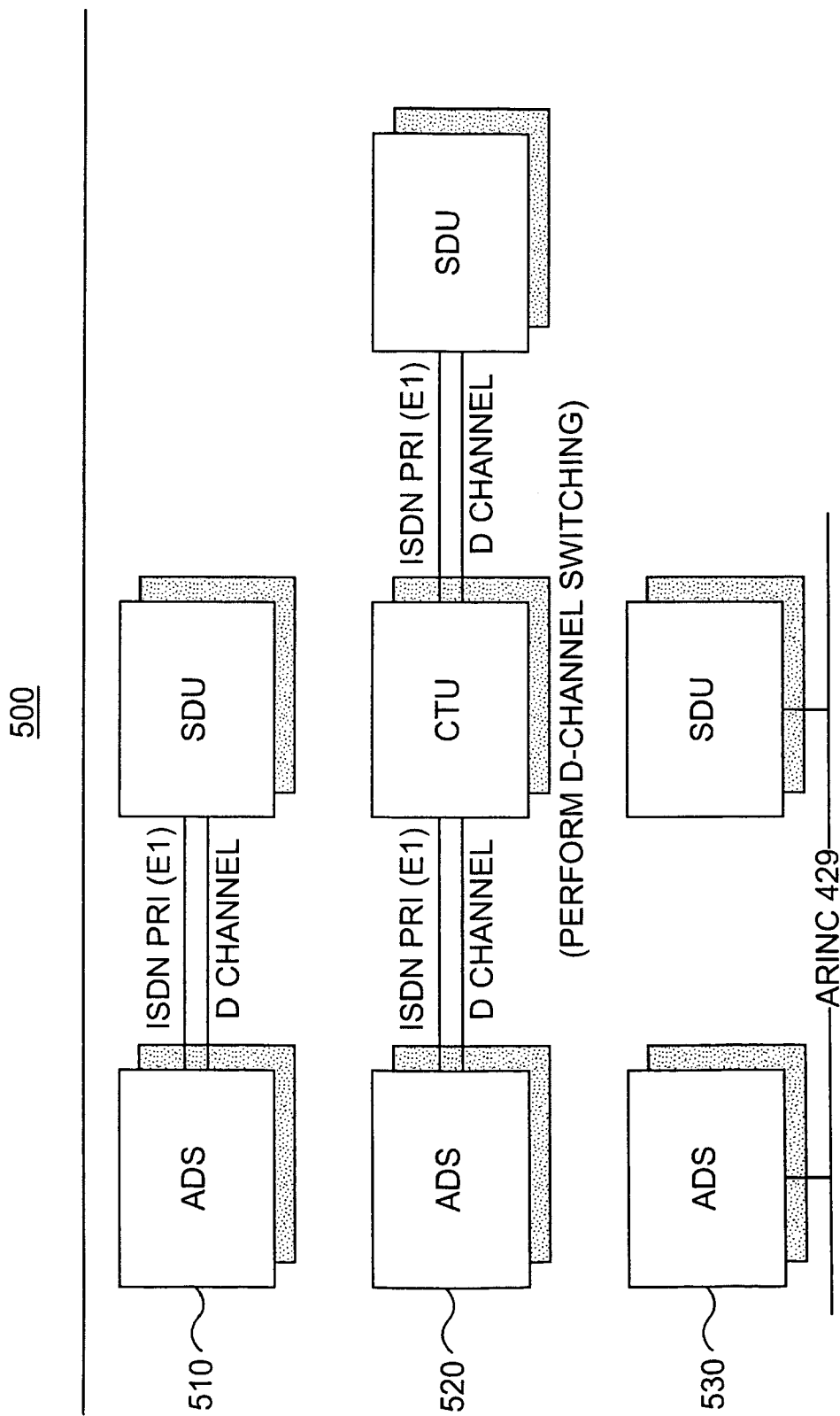
FIG. 4 is a block diagram showing the data link options via a satellite network in accordance with an embodiment of the present invention.

An alternative bearer service used by the system can be a satellite communication service. One example can be the INMARSAT DATA3 services which provides an X.25 service with maximal data throughput (e.g., 10.5 Kbps) and is accessible through the SDU 195. FIG. 4 shows the connection options 500 for connecting the server to the SDU. Two options 510, 520 may use an ISDN D-channel to establish the X.25 SVC (switched virtual circuit) and transport the X.25 data packets. An alternative option 530 can use the high-speed ARINC-429 port 145 to interface directly with the SDU for X.25 call setup and data transport.

Other alternative bearer services can be used including broadband satellite link services—for example, a DBS system. A suitable digital compression system, for example a Moving Picture Expert Group (MPEG-2) system, can be used to multiplex any digital signals with digitized video signals, including any packet data, on to one, or to a very small number of satellite transponders. Other compression methodologies may include, but are not limited to MPEG-4 (e.g., H.263, H.261) and other compression techniques including compression techniques that are standards compliant or proprietary.

Use of a DSS system/interface unit allows for broadband communication independent of the particular link content, either a compressed video signal or a sequence of IP packets which can be deciphered by a video coding device at the GS and the DSS receiver on the aircraft. Passenger and cabin applications for this broadband satellite service include, but are not limited to, software downloading, flight information updates, Internet browsing, and TV/video delivery.

Figure 5:
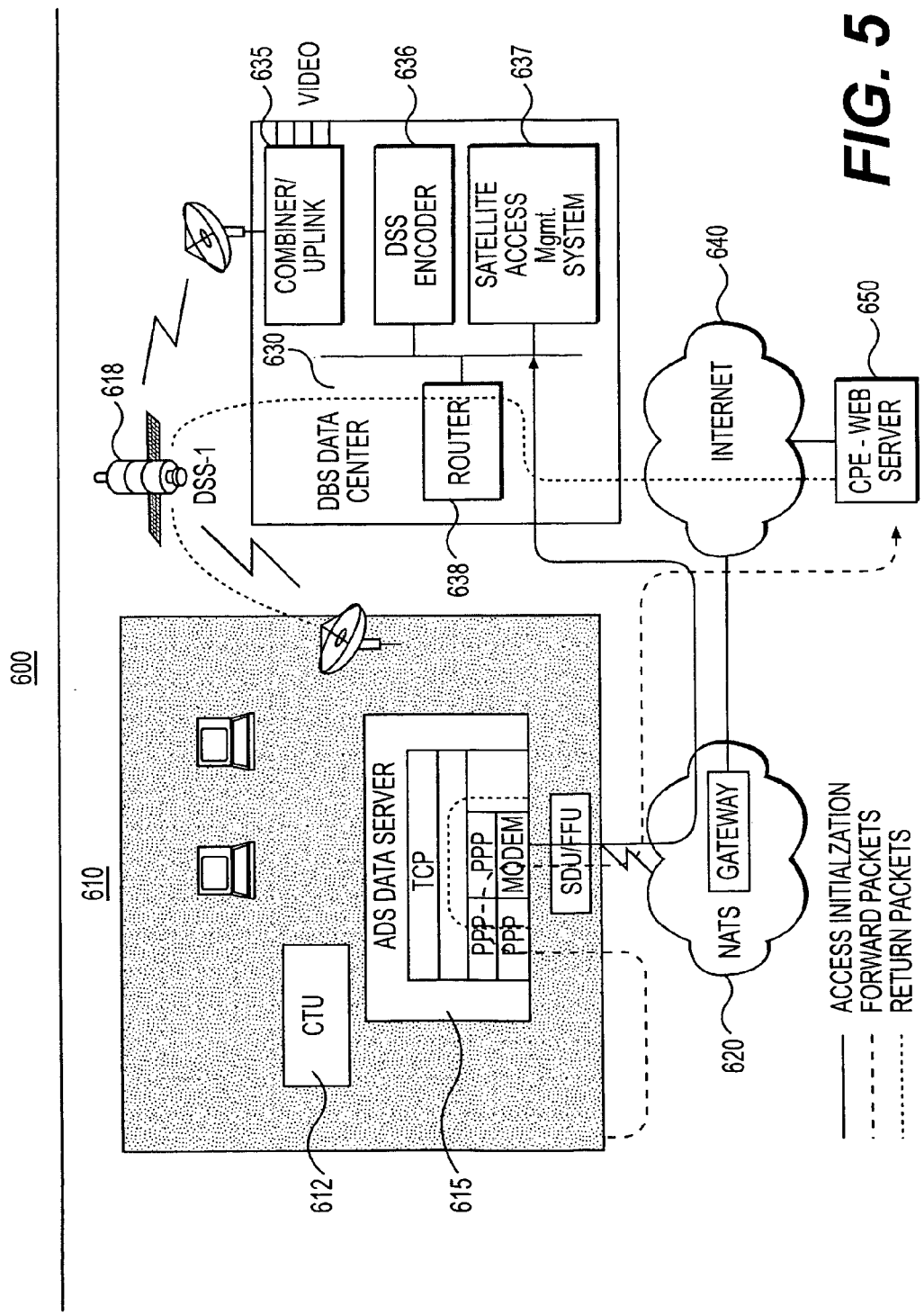
FIG. 5 is a block diagram of a communication system architecture using a satellite network in accordance with an embodiment of the present invention.

FIG. 5 shows the architecture 600 of a satellite data communication service using DSS technology. The system architecture includes aircraft system 610 having server 615 and CTU 612 for facilitating a communications link to a DBS data center 630, via a DBS Satellite 618, and NATS network 620 interconnected to internet facilities 640 and CPE 650. DBS data center 630 includes router 638, satellite access management system 637, DSS encoder 636, and radio equipment including combiner/uplink 635. The system architecture 600 further includes on the aircraft a DSS receiver/decoder and antenna (not shown) to help facilitate the broadband service.

The system architecture 600, using asymmetrical data transport, can provide large bandwidth (e.g., in excess of 5 Mbps) from the network (DSS, upstream) to the aircraft and from the aircraft to the network (e.g., 4.8–9.6 Kbps) (NATS, downstream). A large bandwidth for the upstream can be useful for web applications since most Internet browsing retrieves a much greater amount of information than is initially transmitted.

Alternatively, other satellite bearer services can be used to deliver data communication services, for example, LEO/MEO/GEO (low earth orbiting/middle earth orbiting/geosynchronous earth orbiting) satellite systems. Specific commercial examples of suitable LEO/MEO/GEO systems include, but are not limited to Iridium, Globalstar, ICO, Odyssey, Millennium, Space, Astrolink, Cyberstar, and Teledesic. Use of these systems enables data service offerings in the exemplary range of 384 Kbps–1.2 Gbps, and allows various data applications including video conferencing, high-quality video, high-speed Internet, and virtual LAN service.

Figure 6:
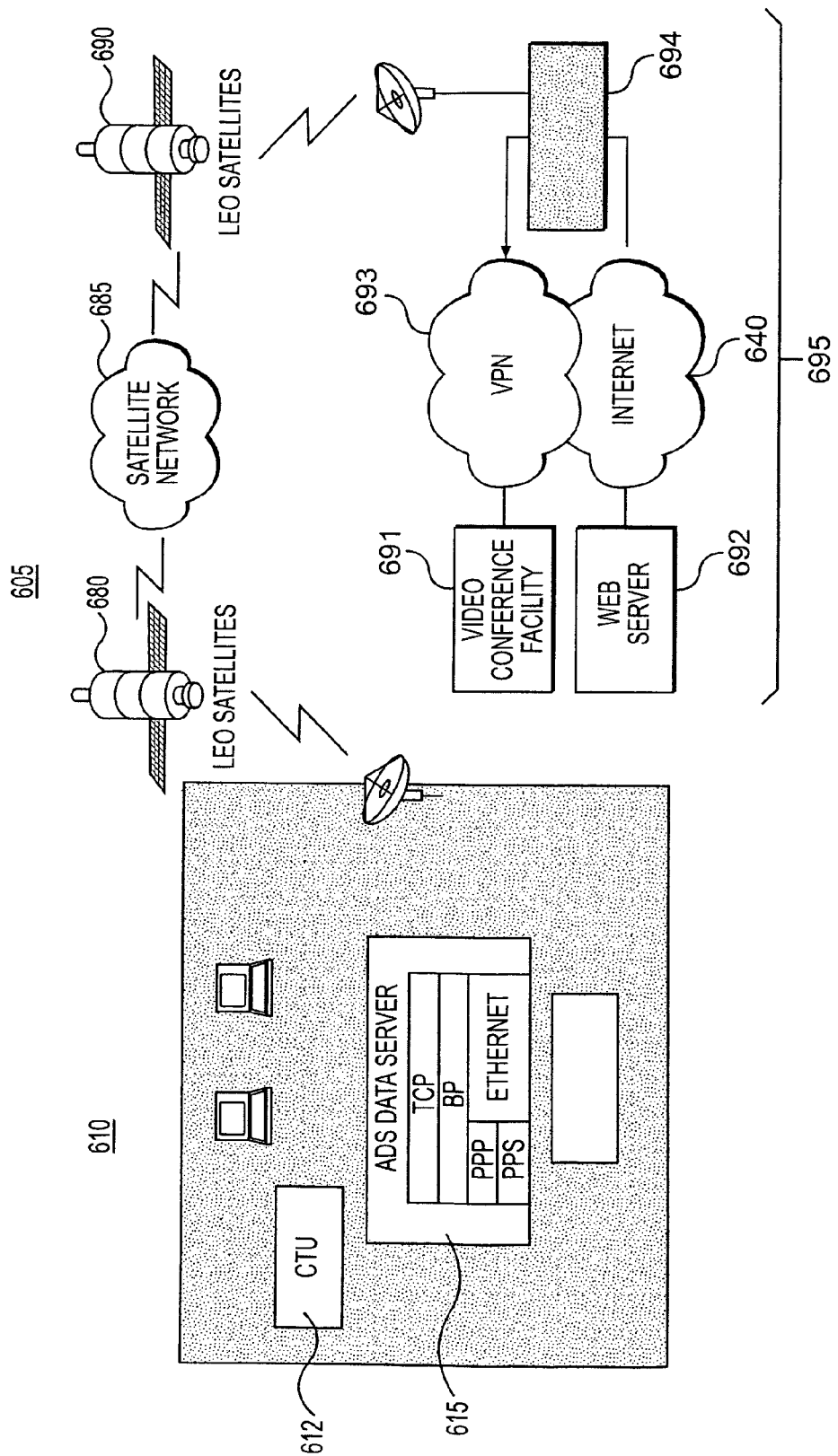
FIG. 6 is a block diagram of an alternative communication system architecture using a satellite network in accordance with an embodiment of the present invention.

FIG. 6 shows a representative example of a data communication system architecture 605 using a LEO/MEO/GEO satellite network. The system architecture 605 includes aircraft 610 having CTU 612 and server 615, with a data communication link to satellite network 685 and ground networks 695 via satellites 680, 690. The ground networks 695 can advantageously include GDG 694, video conference facility 691, VPN (virtual private network) 693, Internet facilities 640, and web server 692. The aircraft 610 acts as one of the ground-based clients receiving and transmitting high speed data via the satellites 680, 690. The system 605 is a two-way system which alleviates the need to use the NATS network for a return path, and allows the server 615 to treat the satellite link as just another two-way bearer service by using the satellite broadband network 685 to interconnect the aircraft 610 and the ground networks 695 via a mobile terminal (MT) (not shown) connecting to the GDG 694.

The satellite network 685 can perform necessary routing and handoff procedures to establish and maintain connectivity between the aircraft 610 and ground networks 695. Additionally, the satellite network 685 can serve as a network cloud providing connectivity between any pair of clients (e.g., aircraft 610 and ground networks 695) preferably using SVCs or PVCs.

The aircraft 610 includes a satellite transceiver unit capable of transmitting and receiving data using any particular satellite network, and having the capability of handling either ATM or frame relay protocol such that a SVC or PVC can be established between the aircraft transceiver box and ground networks 695. Using this setup, IP packets can be encapsulated by these lower layer protocols to enable a transparent conduit for IP packets to travel from the aircraft to the desired ground networks 695.

Figure 7:
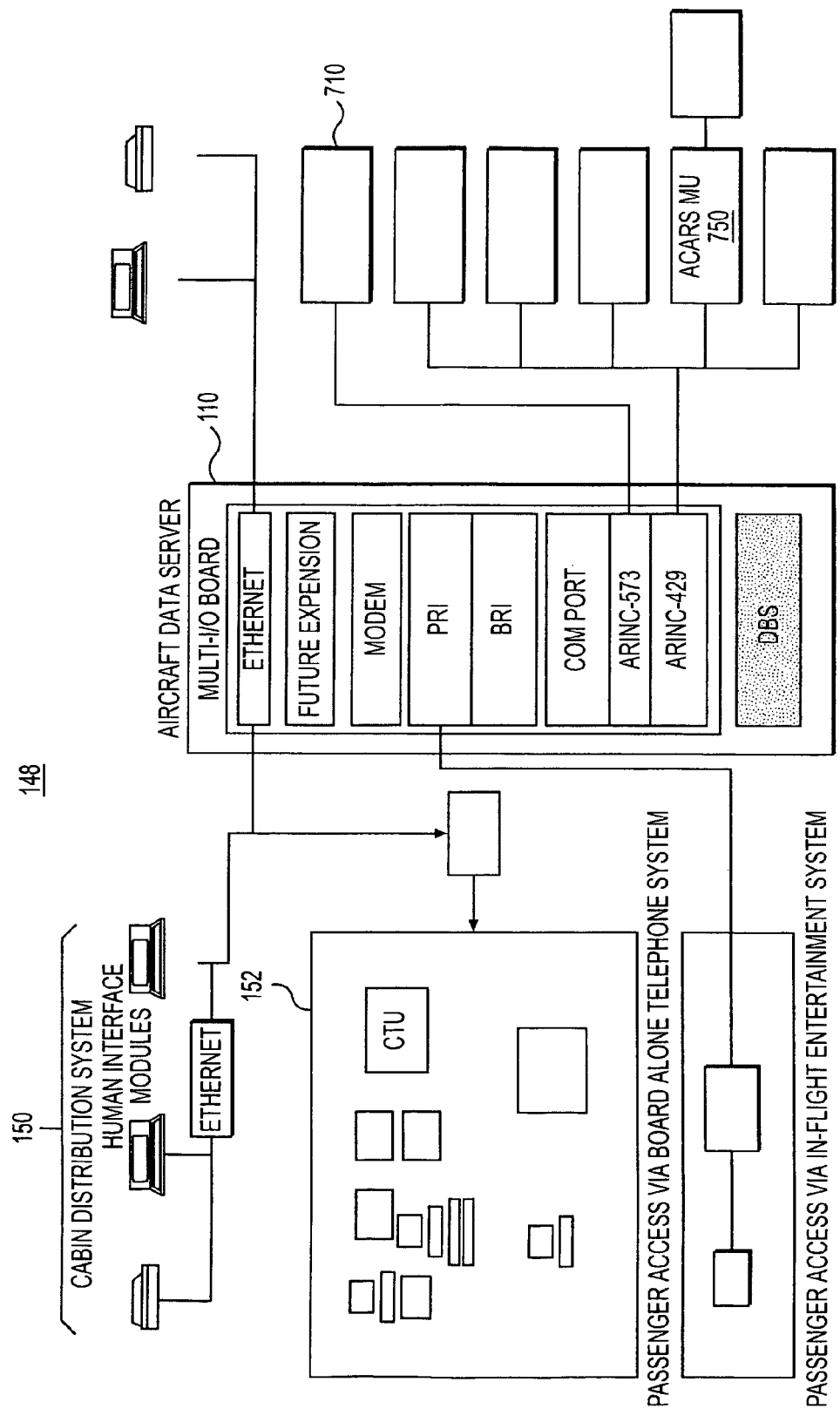
FIG. 7 is a block diagram of another alternative communication system architecture in accordance with an embodiment of the present invention.

Another alternative data link option enables passenger cabin dial-up access services. FIG. 7 shows the communication system architecture 148 for passenger cabin dial-up services. The system architecture 148 includes cabin distribution system 150, server 110 having its components, and can further include digital flight data acquisition unit (DFDAU) 710, ACARS MU 750, and other components.

The system 148 allows a user (passenger) to access internet service, either via an on-board internet service or using the server as a proxy to access the rest of the Internet. At least two types of access are available depending on the configuration of the user's access device (e.g., laptop). For all access scenarios, the connection to the server 110 via the TS function will be over a CTU-switched ISDN B-Channel. Advantageously, the user's access device can be equipped with a PCMCIA V-series modem allowing connection to an RJ-11 jack on the handset, and the handset can be connected to the CTU 152 via the CDS network. For this configuration, a modem pool, as part of the TS function, can peer with the laptop modem, and the link layer protocol is PPP so that proper authentication (for billing purposes) and dynamic IP address assignment can be achieved. Advantageously, a useful COTS TS for serving this function includes, but is not limited to, the Ascend MAX or US Robotics Total Control that, on one end, can interface with the CTU via a T1/E1 PRI or with the BBU via a BRI and, on the other end, with the server via Ethernet (see FIG. 1)

Alternatively, the user's access device can be equipped with an ISDN modem, alleviating the need for the server 110 to have modem capability. In this configuration, an internal COTS PRI PC card can be used for handling the end-to-end digital signal. Advantageously, this particular configuration imposes no additional development on the aircraft end, only requiring modification on the handset to provide a U-interface for connecting to the user access device ISDN modem.

Networking

Figure 8:
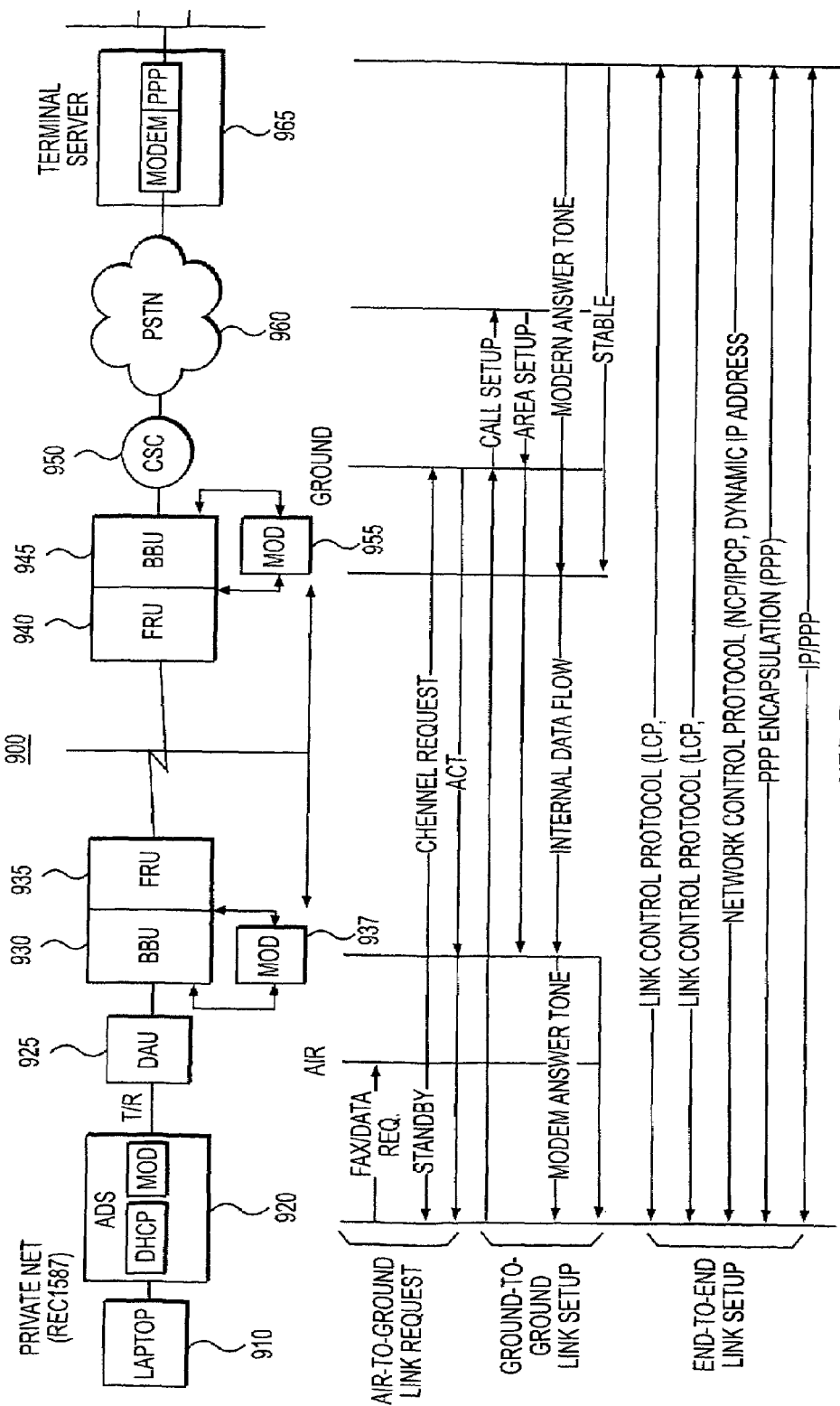
FIG. 8 is a block diagram of another alternative communication system architecture in accordance with an embodiment of the present invention.

FIG. 8 shows a more detailed illustration of the server data link option to the ground using the existing voice-grade NATS network. This system architecture 900 includes access device (e.g., laptop) 910, server 920, DAU 925, BBU 930, modem 937, and RFU 935 as part of the air portion of the architecture 900, and RFU 940, BBU 945, modem 955, switching center 950, PSTN 960, and terminal server (TS) 965 as part of the ground portion of the architecture 900.

As described previously, a point-to-point link can be established between the aircraft and remote server using the PPP link layer protocol to encapsulate IP for transfer across this virtual connection. The data link can be established in three stages, using an air-to-ground link request, ground-to-ground call setup, and end-to-end call setup.

Advantageously, the air-to-ground link can be first requested using a FAX/DATA channel request signal via the DAU 925 to the BBU 930. BBU 930 can determine which ground station to use and can then send a request channel signal, via RFU 935, to the ground station (GS) selected. Once the selected GS finds an available channel, the GS sends a request to the switching center (SC) 950, receives an acknowledgment, and then returns the acknowledgment with the assigned channel to BBU 930, via BBU 945 and RFU 940. After receiving the acknowledgment signal, BBU 930 sends a signal to server 920 via DAU 925 indicating that a channel is being made available. Upon completion of this air-to-ground link request (channel availability), the voice path can be established between the server 920 and the SC 950, and the SC 950 inserts an in-band dial-tone and waits for the server 920 to out-pulse in-band DTMF digits to complete the ground portion of the call connection.

Once the air-to-ground call setup is completed, the ground-to-ground call setup can then proceed. Once the server 920 receives the "dial-now" signal, it then out-pulses the 10-digit phone number to the SC. The SC then connects to the destination number via the PSTN and bridges the two conference legs together. At this point, the SC returns the call progress tone all the way back to the server 920. Upon answering the call, the remote TS 965, either at the GDG or the CPE, sends the in-band modem answer tone, via modem 955, to start the modem negotiation with the calling party, via modem 937. Once the GS detects the modem tone, it cuts the voice path, and sends a signal to the BBU 945 to request it to start modem training with the server 920. At the same time, the GS starts the modem training with the TS 965. When both pairs of modems 937, 955 complete the training, the data can flow through the air link using a particular out-of-band protocol while the data flowing between the two pairs of modems can use a V-series protocol.

Once the setup of the physical layer between the server 920 and TS 965 is completed, the TS 965 can start the link layer negotiation with the server using the PPP protocol in accordance with RFC 1548, 1549 including the three main components of PPP: LCP (Link Control Protocol), NCP (Network Control Protocol), and multi-protocol encapsulation. PPP encapsulation frames can be used to carry the IP traffic across the data link between the two PPP peers, the server 920 and the TS 965 of the ground network. Advantageously, the server 920 may act as a proxy server or perform network address translation for any clients on the same LAN.

Figure 9:
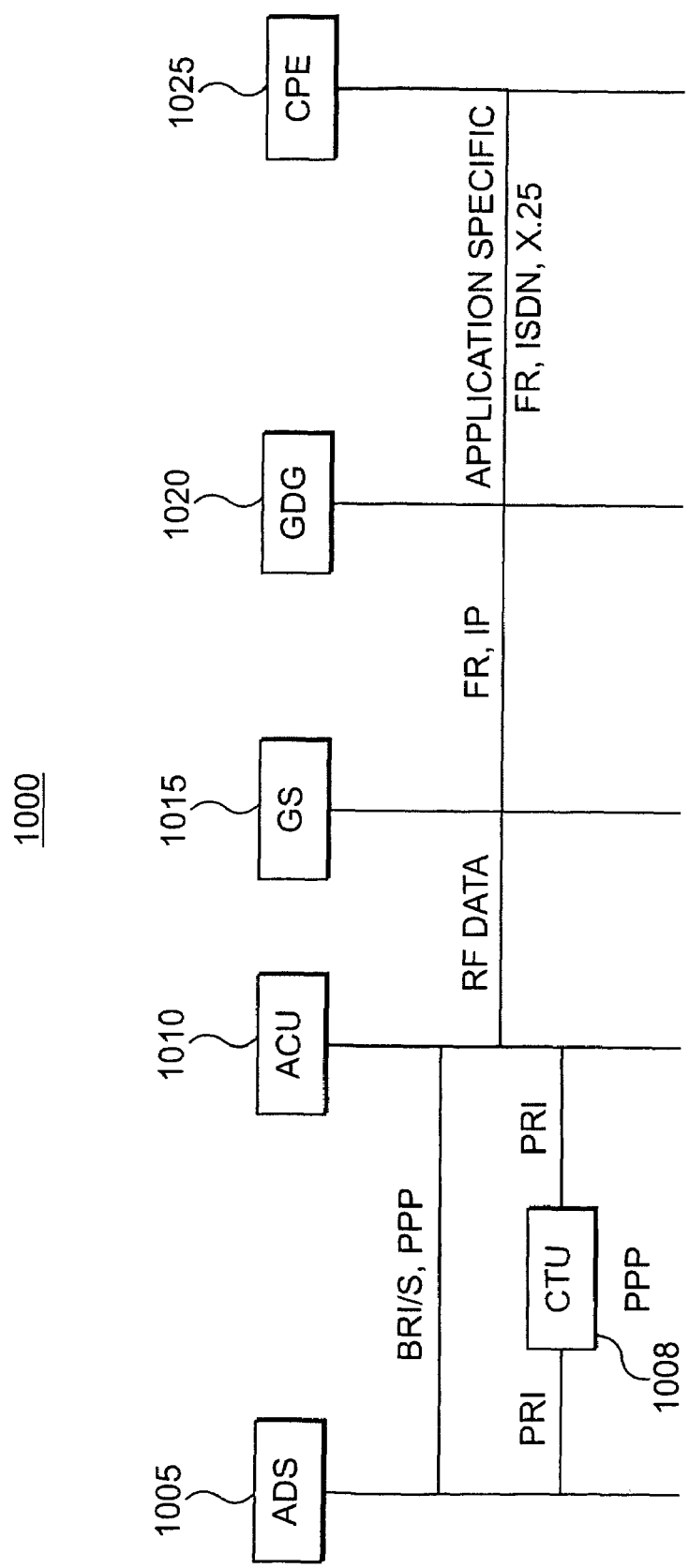
FIG. 9 is a block diagram of another alternative communication system architecture in accordance with an embodiment of the present invention.

FIG. 9 shows a more detailed illustration for the packet data connections using the NATS network. The link architecture 1000 includes server 1005, CTU 1008, ACU 1010, GS 1015, GDG 1020, and CPE 1025. Different data link protocols can be followed over different link segments. Advantageously, a call scenario can start when the server 1005 needs to establish a data link to the ground IP network. When the BRI is used, the server will send out a call setup request via the D channel to the BBU with data call indication. The BBU will then request a traffic channel from the GS 1015 for data use. Once the GS allocates a channel and acknowledges the BBU, the BBU will send back the call connected Q931 message back to the server 1005 and allocate the B channel for such use. All subsequent IP data will go over this clear B channel using PPP to frame the IP packets.

Alternatively, if the ISDN PRI is used instead for call setup, the call request can be initiated when the server sends a call setup message to the CTU 1008 as described previously. CTU 1008, based on the destination number of the call setup message, will send an incoming data call indication to the BBU. Once the BBU detects the incoming call event, it will proceed and negotiate a traffic channel as described previously. Once the channel is allocated, the BBU will send back call answer messages to the CTU to inform the server 1005 that a data link is up and it is ready to receive any PPP packets. Once the PPP packet arrives at the BBU, the BBU will strip off the PPP header from the PPP packet, put the remaining PPP packets into RF frames, and transmit the channel-encoded RF frames over the radio link to the GS 1015.

Once the GS 1015 receives the radio frame, it will recover the IP packet and forward it to the GDG 1020, advantageously serving as a router and interface to the public Internet and to the private network that interconnects the CPE servers such that every IP packet will be routed to the appropriate network based on the destination IP address. For ground-to-air packet data calls, the GDG will send call request messages to the associated GS for certain destination air terminals via a frame relay network. When a radio link is available, a connection will be set up from GDG to server (using circuit mode from GS to server).

Mobility Handling—Air Terminal Tracking

The system can use mobility handling procedures to track locations of Air Terminals/ACU in real time to facilitate proper handoffs for both the air-to-ground (ATG) and ground-to-air (GTA) packet data calls. Handoffs can occur across the link when the aircraft (moving object) travels from one GS coverage area to another, necessitating the selection of an alternative GS to handle the radio link for the aircraft. Also, the GDG, handling IP packets destined to the aircraft, is informed of the new GS handling the radio link with the aircraft.

Handoffs can be initiated due to a plurality of air link conditions. These conditions can include, but are not limited to, pre-determined distance, call times, pilot distance, time, and bit-error-rate (BER) thresholds being satisfied. These conditions may be further defined as initiating a hand-off in response to one of the following: when predetermined distance and call time thresholds are satisfied, when pre-determined distance and error rate thresholds are satisfied, when pre-determined first distance, second distance, and call time thresholds are satisfied, and when pre-determined call time, error rate, and distance thresholds are satisfied.

To facilitate handoff management, the network used for the radio link (an example being the NATS data network) assigns an IP address for each network element. These network elements can include, but are not limited to, ground station management (GSM), ground station controller (GSC), channel thread, switching center (SC), and operating center (OC). IP addresses for air terminals can be assigned dynamically by the channel threads when the AT connects with the GS. When handoff happens, a different channel thread from another GS will be used for the same call; therefore the AT will get a different IP address.

For a packet data call, the IP address of the server is unique and static during the flight. An IP address is assigned to the server dynamically by the GDG when the flight starts and a first packet data call is requested. Thereafter, the same IP address may be used throughout the entire flight and is freed up when the flight ends. The termination of an active flight, activating the release of the IP address, may be triggered by a time-out based on the predetermined flight time or by a message initiated from the ADS to the GDG. Advantageously, a separate pool of IP addresses, distinct from those currently being used, is obtained for the packet data service.

Additionally, the GDG maintains necessary database tables to perform the mobility handling, examples being an IP address assignment table and an AT location table. The IP address table can include the AT identifications and the IP address of the current packet data calls. The AT location table can contain the AT ID and the associated GS and channel threads. Both tables are maintained and dynamically updated by the system. When returning packets are received at the GDG for a certain IP address, the GDG gets the AT ID from the IP address, and finds the AT's current location using the AT location table, inserting the AT ID into the returning packets and sending them to the associated GS.

Circuit Mode Data in the Packet Data Network

Figure 10:
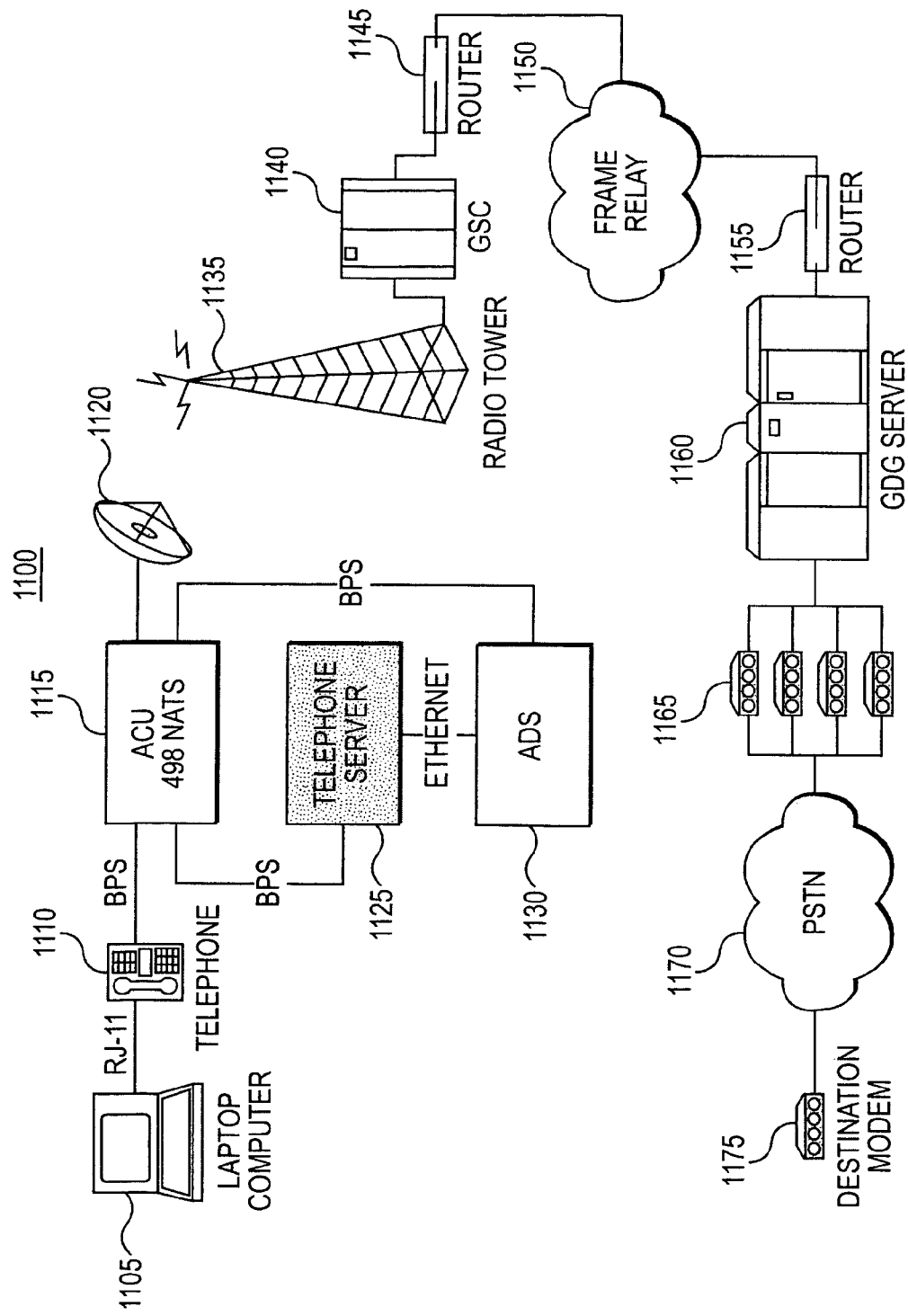
FIG. 10 is a block diagram of another alternative communication system architecture in accordance with an embodiment of the present invention.

The packet data architecture described herein can be used for an improved circuit mode data solution (non-CTU installation). The circuit mode data system architecture 1100 is shown in FIG. 10. The system architecture 1100 includes user access device (e.g., laptop) 1105, telephone 1110, ACU 1115, TS 1125, antenna 1120, radio tower 1135, server 1130, ground station controller (GSC) 1140, router 1145, frame relay 1150, router 1155, GDG 1160, modem pool 1156, PSTN 1170, and destination modem 1175.

Figure 11:
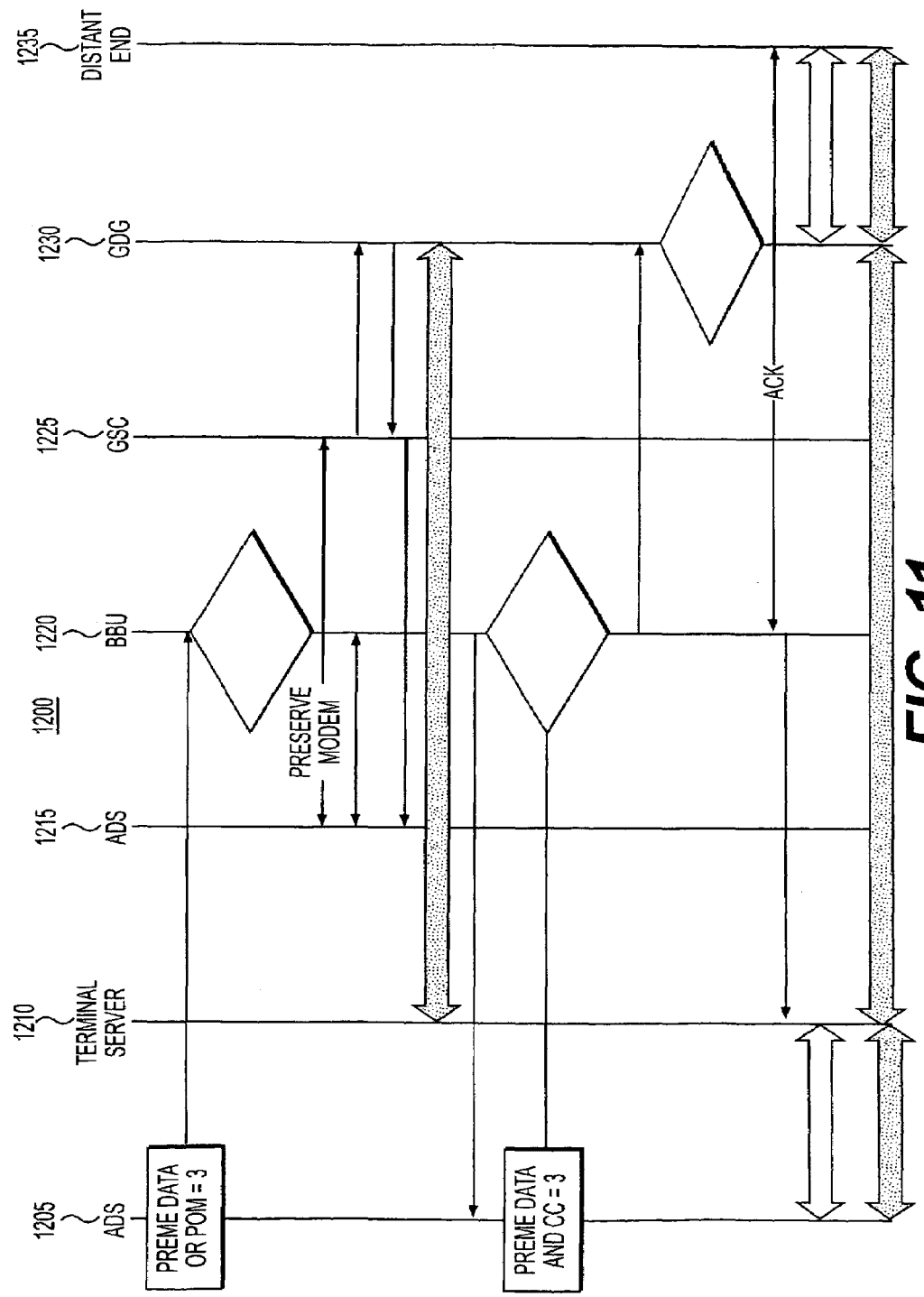
FIG. 11 is a call flow process diagram of a communication system architecture in accordance with an embodiment of the present invention.

FIG. 11 illustrates the call flow procedures 1200 for the circuit mode data solution for the packet data network. In accordance with embodiments of the present invention, the circuit mode data solution can use a TCP/IP interface to be constructed between the server and the GDG. The call flow 1200 includes a plurality of components including user access device (e.g., handset) 1205, TS 1210, server 1215, BBU 1220, GSC 1225, GDG 1230, and remote end device 1235.

Upon user request from the user access device 1205, the BBU 1220 can check to verify that adequate radio and server resources are available. Assuming adequate resources are available, the BBU 1220 will then proceed to reserve a modem on the TS 1210 and establish a link to the GSC 1225. Once the link to the ground is established, an end-to-end TCP circuit is setup between the appropriate GDG 1230 and TS 1210 components, advantageously performed using telnet or a socket connection between the two components. The BBU 1220 also forwards dialing and dialed numbers to the GDG 1230. Pending a sanity check on the dialed number and a validation check on the billing instrument, the GDG 1230 will initiate a connection to the desired destination party via a modem. Simultaneously, the BBU 1220 will transfer the call to the TS 1210 voice-band-data BRI interface with both modem connections (i.e., passenger to TS 1210 and GDG 1230 to remote end device) negotiating the link separately. Upon confirmation that these two links have been established, the GDG 1230 and TS 1210 can shuttle information to each other. Additionally, this configuration can support handoffs of voice-band-data calls.

Server Air Terminal

The Air Terminal (AT), including the BBU, can provide a plurality of packet handling services. These services can include an AT/GS radio data bridge providing a data link layer with end-to-end error correction and with end-to-end packet sequencing. Additional services include any combination of half-rate and full-rate channels for the packet data service.

Figure 12:
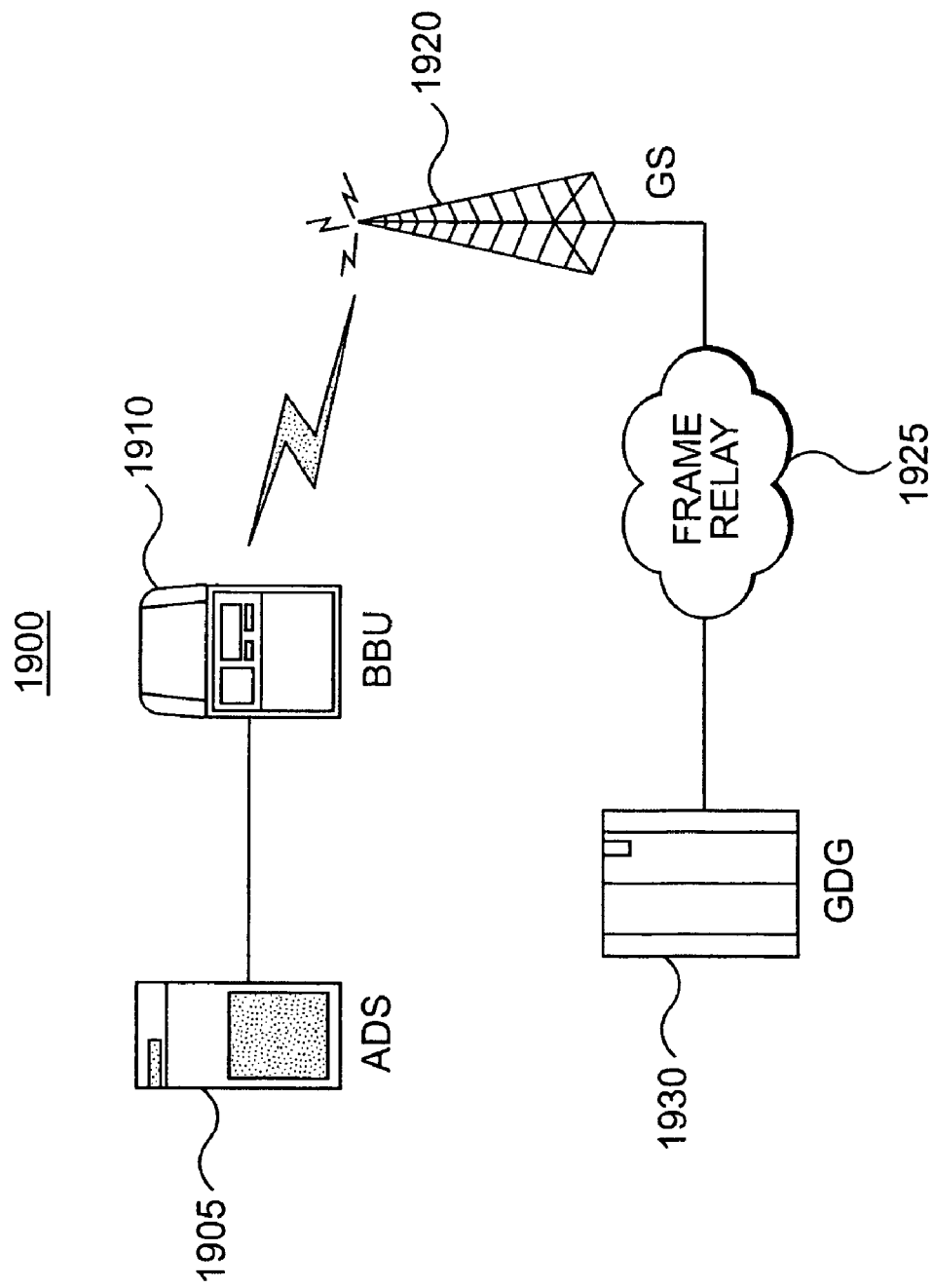
FIG. 12 is a block diagram of another alternative communication system architecture in accordance with an embodiment of the present invention.

FIG. 12 illustrates the communication architecture 1900 for providing the radio data bridge between AT and GS, preferably forming a low error rate "bit-pipe" for communication between the AT and GS. The components of the system include server 1905, BBU 1910, GS 1920, and GDG 1930. An optional component includes frame relay network 1925. A plurality of call control features may be provided by the AT including Packet Data Seizure Override, Established Packet Data Link Override, Hand-off, and Override Hand-off. Preferably, the BBU 1910 may override a packet data seizure should it be determined that a higher priority ATG voice call must be serviced. For this event, the BBU 1910 uses the packet data priority negotiated at the establishment of the packet data link to determine whether override is allowed, and the AT notifies the data communication server 1905 of the seizure override via an appropriate protocol message (e.g., LAPD).

Additionally, the BBU 1910 may override an established packet data link should it be determined that a higher priority request must be serviced (e.g., ATG or GTA voice calls). Again, the BBU 1910 uses the packet data priority negotiated at the establishment of the packet data link to determine whether override is allowed, and the AT notifies the data communication server of the link override via an appropriate protocol message (e.g., LAPD).

For hand-offs, the AT preferably notifies the data communication server 1905 of an impending hand-off using an appropriate protocol message (e.g., LAPD). The server 1905 may then accept or delay the hand-off, wherein for either case the server 1905 signals the BBU 1910 using an appropriate protocol message.

For Override Hand-off, in conditions where a packet data call and a voice call are active, the AT may determine that it is necessary to hand-off the voice call. To perform this override, the AT places the packet data call in a suspended mode to facilitate a voice call hitless hand-off, wherein the packet data link is reestablished through a newly selected GS. As with normal hand-offs, the BBU 1910 notifies the server of the pending hand-off using a protocol message, and the server 1905 may accept or delay the hand-off, wherein for either case the server 1905 sends the appropriate protocol message to the BBU 1910.

Server Software Architecture

Figure 13:
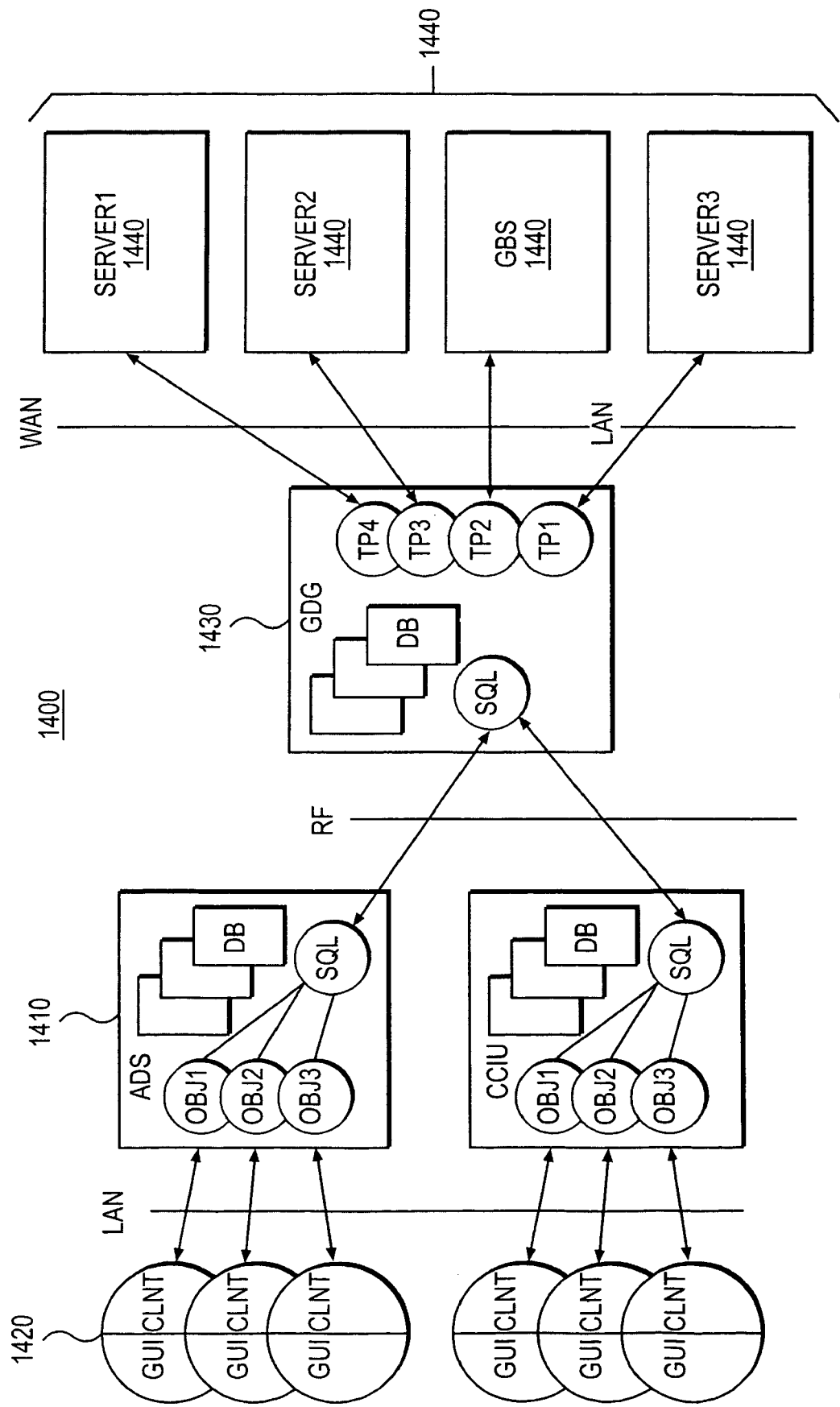
FIG. 13 is a block diagram of the software infrastructure for the data communication server in accordance with an embodiment of the present invention.

As illustrated in FIG. 13, the server of the data communication system can advantageously include an object-oriented software architecture 1400. Software architecture 1400 includes server 1410, GDG 1430, and ground-based servers 1440. An object-oriented software architecture is exemplary and alternative software architectures may be used including, but not limited to, C++, JAVA, HTML, etc.

Use of an object-oriented design includes that each system resource or service provider bears an object entity, and that services are accessible via the published methods. Resources are managed within the objects. Additionally, the server 1410 may advantageously use a client-server model wherein the clients request the service by accessing the published methods or interfaces on the servers 1440. The software architecture also advantageously may use location transparency wherein the objects are accessible by the clients universally within the confines of the access control and the network connectivity.

As shown in FIG. 13, the software architecture 1400 may optionally include GUI (Graphical User Interface) 1420 having interfaces allowing data communication applications to request services from the server 1410. Preferably, objects on server 1410 can advertise services that applications are allowed to access, the applications also accessing a Structured Query Language (SQL) manager as needed to interact with the GDG 1430 to retrieve or send data. The GDG 1430 may serve as a Data Proxy, using local storage space to either cache the data for upload to the server 1410 or download to the customers' (user) ground-based servers (GBS) 1440. GDG 1430 will then use the proper transport to interact with the GBS 1440 for data transfer. The GUI 1420 can be optional to the design as applications may run unattended without human intervention and therefore are only used for maintenance operations under those conditions. The design of the architecture 1400 is independent of the underlying operating system.

Figure 14:
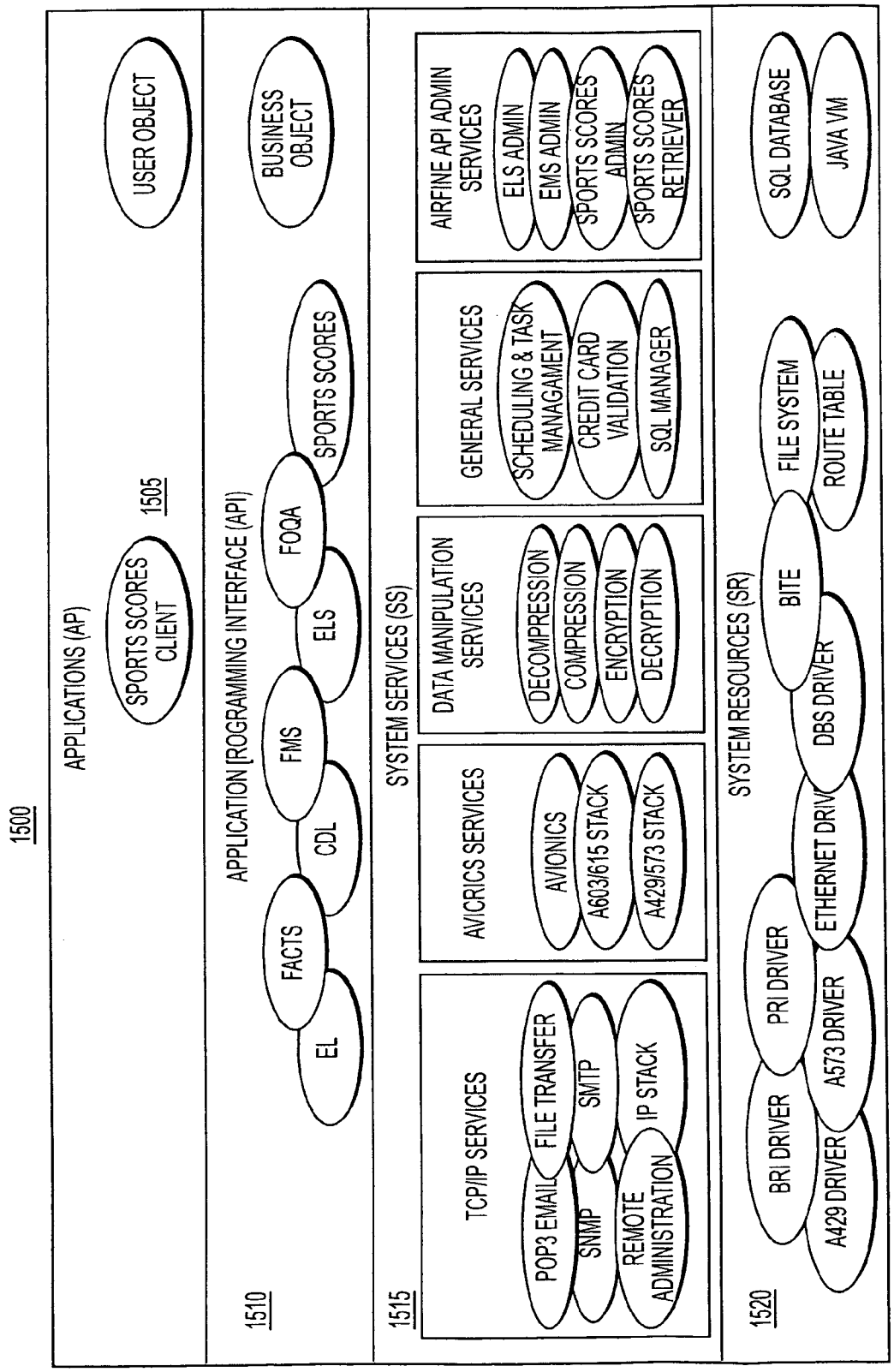
FIG. 14 is a software function layer diagram of a communication software infrastructure for the data communication server in accordance with an embodiment of the present invention.

The software architecture can be logically divided into four functional layers 1500 as shown in FIG. 14. These layers include an applications (AP) layer 1505, application programming interface (API) layer 1510, system services (SS) layer 1515, and system resources (SR) layer 1520. The AP layer can contain applications that are developed by the aircraft or other parties. The SR layer contains the system resources that are used by the SS layer when providing service to higher-layer components. The SR components can include the server bearer resources, the databases, the data storage, and JAVA execution environment, etc.

The SS layer components provide system-level services to the objects in the API layer or to other components in the same layer. The services can include, but are not limited to, various TCP/IP services, avionics standards services, data compression and cryptographic services, scheduling, and transaction-oriented services. The SS layer includes API administration SS to manage all API objects, its purpose being to provide access control, service activation/deactivation, and property change capabilities of the API object to the data communication service provider.

Advantageously, the SR layer may include at least four types of components used by the data communication server. These components can include device drivers, BITE system, file system, and miscellaneous facilities. Dependent on the underlying OS of the data communication server, the components of the SR layer may be part of the embedded OS or may be specially designed for aircraft data communication services.

Device drive (DD) components enable the SS layer components to interact with communication devices for data exchange with the GDG or with onboard avionics devices. Advantageously, the DD may be part of the underlying OS or may be specially developed, and includes a plurality of components including a BRI driver, PRI driver, Ethernet driver, ARINC-429 driver, and ARINC-573 driver.

The SR file system can advantageously provide a consistent way to store (or provide permanent storage—persistence) the data including allowing the SS components to perform read, write, and delete operations based on particularly developed user rights or permissions. Additionally, the file system can include a special system file, the route table, used for determining the routing for IP packets. The route table can include a set of known routes and be locally stored in non-volatile memory.

Miscellaneous facilities can include an SQL database and a JAVA Virtual Machine (VM). The SQL database provides a database engine to store and manage the data needed by the server SS and API components, including all necessary database transactions such as query, insert, update, and delete functions. Advantageously, the JAVA VM can allow the server to access other network-based services using JAVA applications or applets. Use of the VM allows the server to write an API using JAVA architecture that allows clients from other platforms running a different OS to request services from the data communication server with a standardized protocol.

The API layer provides a consistent way for the AP to acquire and utilize data-oriented aircraft services. Advantageously, a generic object is produced, an example being the generic business object (BO), that will allow access to these services assuming specific transport protocols (e.g., TCP/IP, UDP, etc.). This allows use of an object without specific knowledge of the service support structure. Alternatively, each component in the API layer can be represented as an object that provides one specific aircraft service, each object containing three major parts—the communicator, the receptor, and the service logic. Services provided by each API object can be characterized by properties, methods, and events and are exposed through the communicator and the receptor.

Figure 15:
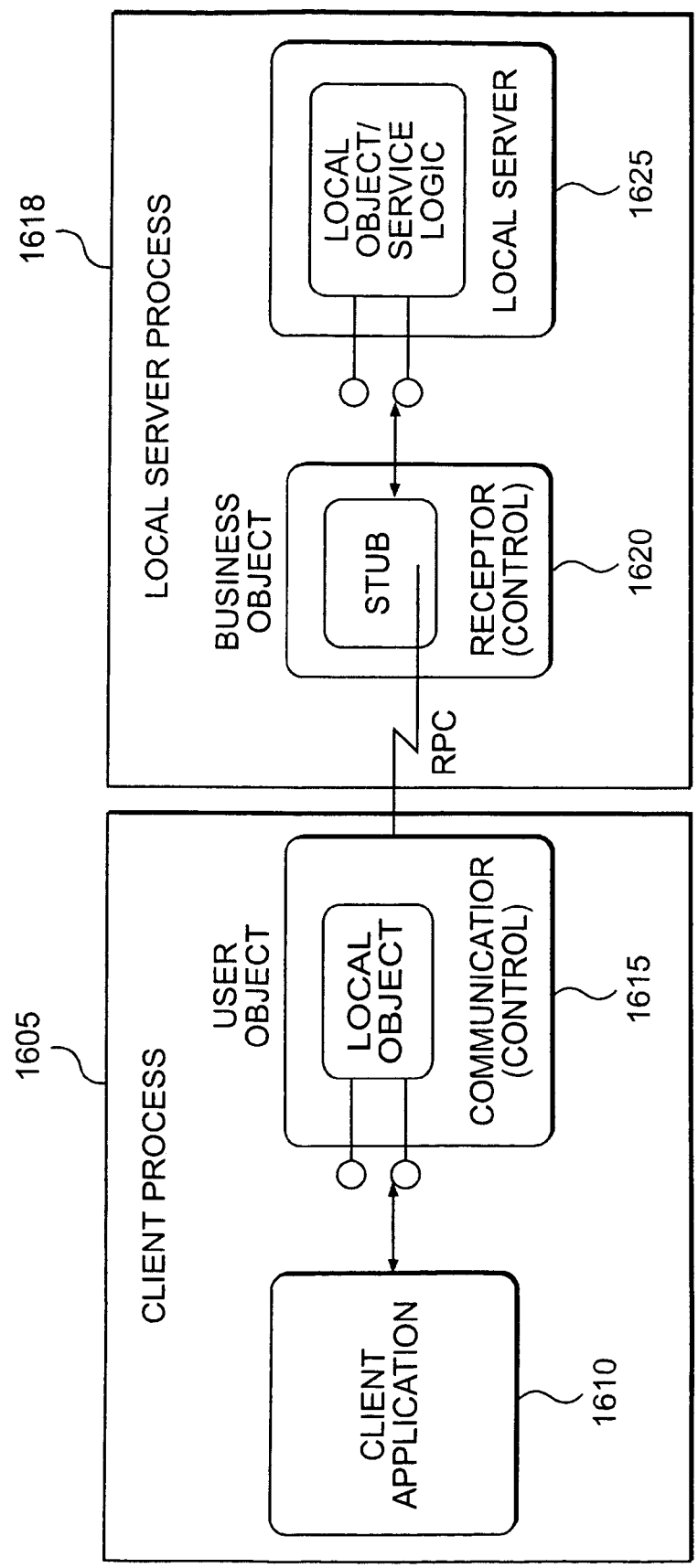
FIG. 15 is a block diagram for the service logic architecture of a communication software infrastructure for the data communication server in accordance with an embodiment of the present invention.

The communicator is a client-side component which can be represented as a control in a user object (UO), or the object embedded in AP, which enables the AP to invoke services and to communicate or share the data construct with the object via a known set of properties, methods, and events. The receptor component which can be represented as a control in the business object and which resides inside the object itself, is used to accept the service requests and to share and communicate back with the AP. The service logic is the implementation of the object itself and has access to the lower-layer components. This architecture is illustrated in FIG. 15 and comprises the client process 1605 and the local server process 1618. Client process 1605 includes client application 1610 and user object 1615, and local server process 1618 includes business object 1620 and local server 1625.

Other API objects can include the FMS (Flight Management System) object for database loading, the FOQA (Flight Operations Quality Assurance) object for obtaining and managing ACMS data, and other objects.

Figure 16:
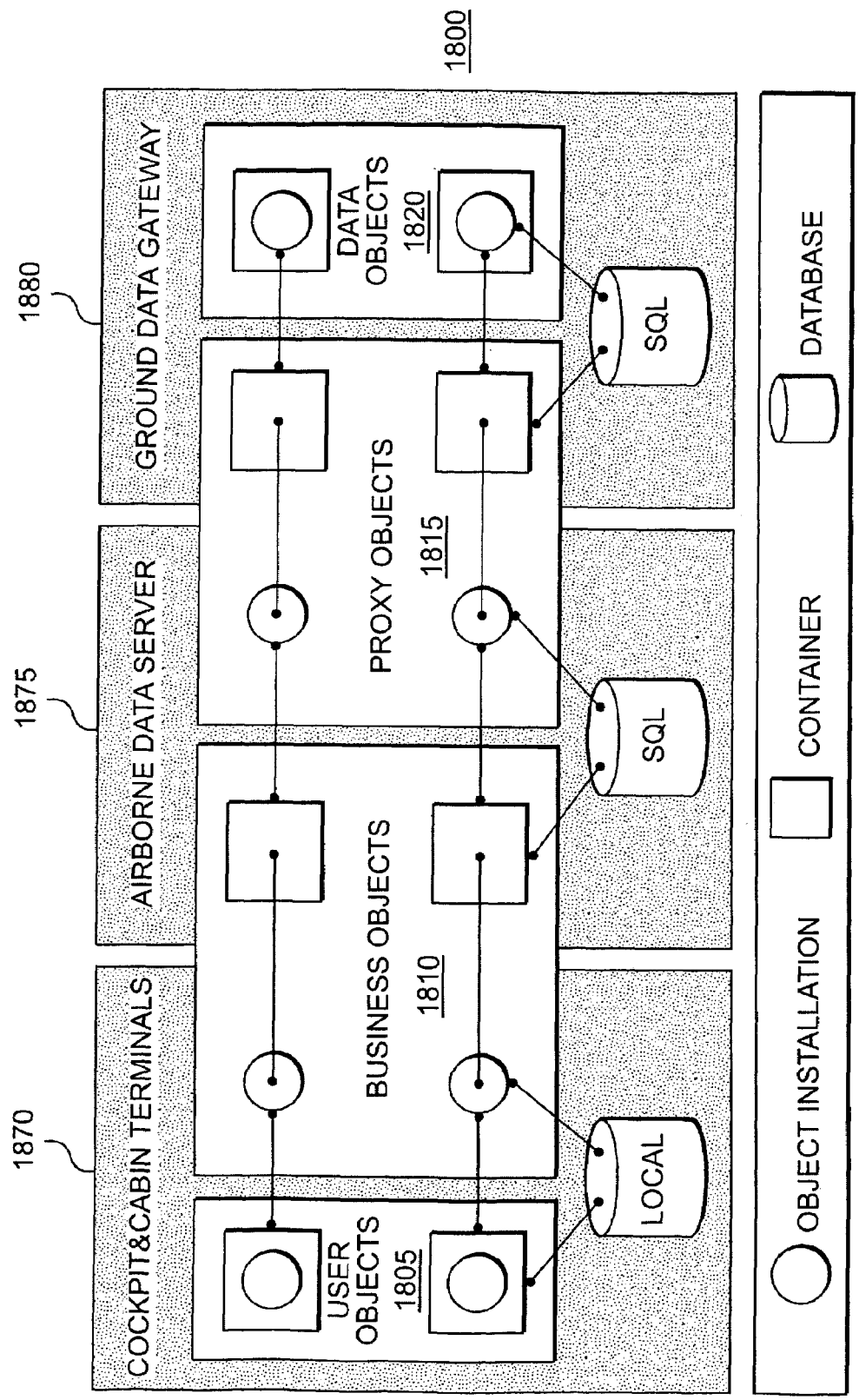
FIG. 16 is a block diagram of an alternative software infrastructure for the data communication server in accordance with an embodiment of the present invention.

In practical operation, the communicator can provide the clients the necessary networking and protocol handling capability to execute services on the server, and the receptor handles the requests initiated by the clients and starts "Instances" of the services being requested. Following this process, the communicator of the API allows the applications to make use of the services provided by the server. Similarly, the communicator of the SS object allows other SS and API components to utilize the services provided by the SS object. FIG. 16 illustrates an exemplary configuration for the software architecture 1800 for an end-to-end system between the cockpit and cabin terminals 1870, airborne data server 1875, and ground data gateway 1880.

Network Security

Figure 17:
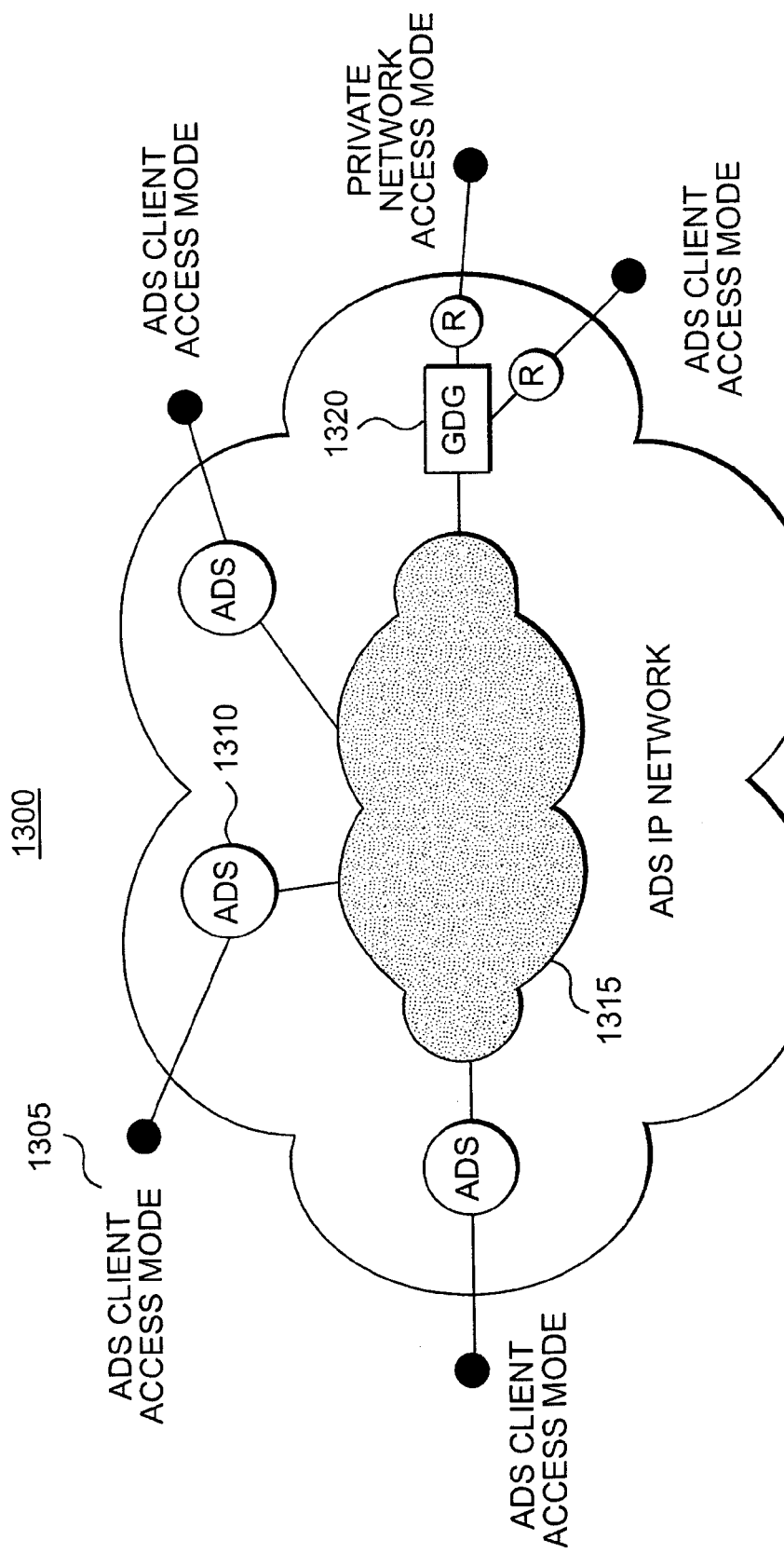
FIG. 17 is a security system architecture of a communication system in accordance with an embodiment of the present invention.

Network security is an important feature of the data communication server. As shown in FIG. 17, the system security architecture 1300 may include a plurality of access nodes 1305 interconnected to a plurality of data communication servers 1310, and a public or private security network 1315. Advantageously, the network may include GDG 1320. An exemplary security configuration can include a perimeter-based security architecture having filtering performed at the borders and more complex filtering performed at internal checkpoints, and including proper address assignment and packet/route filtering.

Advantageously, addresses can be separated into two blocks of addresses for subscribers (customers) and new users, including a public address block for the customers and a private address block for the new users. Route filtering and packet filtering can be provided to protect the network from bogus entry and address-spoofing.

For basic network access services (such as Internet access), the data communication server can perform dial-up authentication when the user connects to the server. PPP can be advantageously used to provide a plurality of in-protocol authentication methods. Preferably, a remote access dial-up user service (RADIUS) may be used to perform the dial-up authentication, allowing exchange of login information and user resource information between a client and a RADIUS server, the server containing a database. During an authentication session, the login information is sent to the RADIUS server, the user is authenticated, and the server returns the user data record provisioned in the database; such information may include the IP address assignment, the source and destination filter IDs, allowed access time, and other information.

Additionally, another method can be used to protect the user data routed through the network, the method including use of a Pretty Good Privacy (PGP) protocol which includes encryption and digital signature. For PGP, a digital signature is first created by generating a hashing code of the data file to be sent and encrypting the code with the sender's private key. The digital signature is first verified by decrypting the hash code using the sender's public key and comparing it to the new hash code generated for the received data file. Confidentiality is provided by properly encrypting the data using a randomly created session key. The key is encrypted using the recipient's public key and prepended to the just-encrypted data file. The signature is prepended to the data file before encryption when a signature is used together with the data file.

To decrypt the data file and to verify the signature, the recipient first decrypts the session key using the recipient's private key and uses the key to decrypt the encrypted block. Once the block is decrypted, the signature is verified using the process described previously. Using PGP, the data communication server can provide confidentiality of the data file and can classify the data file into different security levels by encrypting files with different public keys. Additionally, only authorized accounts/personnel can decrypt the message and using the digital signature ensures that the files come from the right applications or accounts, therein preventing forging of the document.

Although the invention is described herein using the NATS network as a primary bearer service for an aircraft data communication service, it will be appreciated by those skilled in the art that modifications and changes may be made without departing from the spirit and scope of the present invention. As such, the method and apparatus described herein may be equally applied to any bearer service providing data communication services from any moving object.

What is claimed is:

1. A method of providing wireless data communication services, comprising:
 establishing a radio communication path, via a voice network, between a moving object and a first ground station using a data communication server co-located with the moving object, the data communication server including a plurality of interface units for accessing different data networks including an Ethernet interface unit, an Integrated Services Digital Network (ISDN) interface unit, and a pre-determined wireless data network interface unit;
 said step of establishing including the steps of:
  sending a channel request signal to the first ground station; and
  receiving an acknowledgement signal, including a channel assignment, back from the first ground station indicating a channel is being made available and being assigned for the radio communication path;
 initiating call setup procedures including sending in-band signaling to the first ground station in response to a tone from the first ground station, the first ground station, in response to the in-band signaling, establishing a connection with a second ground station and bridging the radio communication path with the connection to the second ground station;
 training at least one modem of the moving object to be in communication with a first ground station modem, the first ground station modem substantially simultaneously training itself to be in communication with a second ground station modem;

transmitting data to said second station, via the first ground station, using a pre-determined protocol for the radio communication path and second pre-determined protocol for the connection between the first ground station and the second ground station; and establishing a link layer connection between the moving object and the first ground station using a point-to-point protocol over the voice network.

2. The method of claim 1, wherein the moving object is a flying vehicle.

3. The method of claim 1, wherein said data communication server includes software architecture including software functional layers, the layers including a system resources layer, a system services layer, an application programming interface layer, and an application layer, and the application programming interface layer including components representable by objects for providing communication services with each object including a communicator, a receptor, and service logic.

4. The method of claim 1, wherein said steps of transmitting and receiving includes providing packet handling services, the packet handling services including a radio data bridge across the radio communication path, via a data link layer of a protocol stack, the radio data bridge including end-to-end error correction and end-to-end packet sequencing; and the radio data bridge including either of a half-rate, full-rate, or combination of half-rate and full-rate channels across the radio communication path.

5. The method of claim 1, further comprising:
assigning a pre-determined IP address to the first ground station; and
allowing access to said transmitted and received information only for pre-determined users of said IP address.

6. The method of claim 5, further comprising:
performing authentication procedures, using a remote access dial-up service to a ground server, on users before allowing access to said transmitted and received information only for pre-determined users of said IP address; and
securing said transmitted and received user information from unauthorized access using a secure socket layer protocol.

7. The method of claim 5, further comprising:
performing authentication procedures, using a remote access dial-up service to a ground server, on users before allowing access to said transmitted and received information only for pre-determined users of said IP address; and
securing said transmitted and received user information from unauthorized access using a PGP security protocol;
said step of securing including the steps of:
creating a digital signature by generating a hashing code of the user information to be transmitted;
encrypting the code with the user's private key;
encrypting the user information using a randomly created session key; and
encrypting the session key using the public key of a recipient of the user information.

8. The method of claim 7, further comprising:
decrypting the session key using the user's private key, enabling decryption of the user information and verification of the digital signature;
decrypting an encrypted block of user information using the session key; and verifying the digital signature by decrypting the hash code using the user's public key.

9. A method of providing wireless data communication services, comprising:
establishing a radio communication path, via a packet data network, between a moving object and a ground station using a data communication server co-located with the moving object, the data communication server including a plurality of interface units for accessing different data networks including an Ethernet interface unit, an ISDN interface unit, and a pre-determined wireless data network interface unit;
said step of establishing including:
sending a channel request signal, via the ISDN interface unit and a communication unit, to the ground station; and
receiving an acknowledgement signal via the ISDN interface unit and the communication unit, including a channel assignment, back from the ground station indicating a channel is being made available and being assigned for the radio communication path; and
transmitting data to said ground station over said packet data network using a B-channel ISDN link, said data packets being P packets encapsulated in a point-to-point protocol frame.

10. The method of claim 9, wherein said moving object is a flying vehicle.

11. The method of claim 9, wherein said step of transmitting includes tunneling the point-to-point frame to said ground station using a tunneling protocol, at layer two of a protocol stack, said tunneling enabling a plurality of radio communication paths between the moving object and the ground station, and enabling a higher data transmission rate than that allowable without tunneling.

12. The method of claim 9, wherein said radio communication path between the moving object and the ground station is shared by voice and data traffic with said data traffic being interleaved over said voice traffic, said data traffic being inserted, via data frames, into existing voice traffic channels when silence is detected on the existing voice traffic channels.

13. A method of providing wireless data communication services, comprising:
establishing a radio communication path, via a packet data network, between a moving object and a ground station using a data communication server co-located with the moving object, the data communication server including a plurality of interface units for accessing different data networks including an Ethernet interface unit, an ISDN interface unit, and a pre-determined wireless data network interface unit;
said step of establishing including:
sending a channel request signal, via the ISDN interface unit and a communication unit, to the ground station; and
receiving an acknowledgement signal via the ISDN interface unit and the communication unit, including a channel assignment, back from the ground station indicating a channel is being made available and being assigned for the radio communication path; and
transmitting data to said ground station over said packet data network using a B-channel ISDN link, said data packets being IP packets encapsulated in a point-to-point protocol frame;

assigning a channel thread to the radio communication path, and assigning an IP address to an air station, interconnected to the data communication server, for the moving object;

recording the air station IP address assignment and channel thread assignment in a location table;

establishing an alternative radio communication path, initiating a hand-off, via the air station, with an alternative ground station, and subsequently terminating the radio communication path with the ground station, a new channel thread being assigned and the air station being assigned a new IP address that establishes the alternative radio communication path, the location table being updated with the new air station IP address and new channel thread assignment, and said alternative radio communication path being established in response to a pre-determined hand-off algorithm being satisfied; and data packets to be routed from the ground station to the moving object being routed by looking up the current air station IP address from the location table and inserting this IP address into the packets.

14. The method of claim 13, wherein the pre-determined hand-off algorithm is a hand-off procedure selected from the group consisting of a hand-off being initiated when pre-determined distance and call time thresholds are satisfied, a hand-off being initiated when pre-determined distance and error rate thresholds are satisfied, a hand-off being initiated when pre-determined first distance, second distance, and call time thresholds are satisfied, and a hand-off being initiated when pre-determined call time, error rate, and distance thresholds are satisfied.

15. A method of providing data communication services, comprising:

establishing a radio communication path, via an INMARSAT satellite system and using a packet data protocol, between a moving object and a first ground station using a data communication server and a satellite communication unit co-located with the moving object, the data communications server including a plurality of interface units for accessing different data networks including an Ethernet interface unit, an ISDN interface unit, and a pre-determined wireless data network interface unit;

said step of establishing including the steps of:
sending a channel request signal, via the ISDN interface unit and a communication unit, to the ground station; and
receiving an acknowledgement signal via the ISDN interface unit and the communication unit, including a channel assignment, back from the ground station indicating a channel is being made available and being assigned for the radio communication path; and transmitting data to said ground station over said INMARSAT satellite packet data network using either of D-channel ISDN link or ARINC link between the data communication server and the satellite communication unit, said data packets being IP packets.

16. A method of providing data communication services, comprising:

establishing a radio communication path, via a Direct Broadcast satellite system and internet service provider, between a moving object and a ground station of the internet service provider using a data communication server and a satellite communication server co-located with the moving object, the data communication server including a plurality of interface units for accessing different data networks including an Ethernet interface unit, an ISDN interface unit, and a pre-determined wireless data network interface unit;

said step of establishing including the steps of:
sending a channel request signal and pre-determined access management information including a client IP map, via the ISDN interface unit and a communication unit, to the ground station of the internet service provider; and
receiving an acknowledgement signal via the ISDN interface unit and the communication unit, including a channel assignment, indicating a channel is being made available and being assigned for the radio communication path; and transmitting data to said ground station of the Internet service provider over said direct broadcast satellite system enabling usage of Internet services by a user in the moving object, said data being transmitted as an IP packet encapsulated in a point-to-point frame.

17. A method of providing data communication services, comprising:

establishing a radio communication path, via a packet data network using circuit mode data, between a moving object and a ground station of the internet service provider using a data communication server and a satellite communication server co-located with the moving object, the data communications server including a plurality of interface units for accessing different data networks including an Ethernet interface unit, an ISDN interface unit, and a pre-determined wireless data network interface unit;

said step of establishing including:
sending a channel request signal, via the ISDN interface unit and a communication unit, to the ground station; and
receiving an acknowledgement signal via the ISDN interface unit and the communication unit, including a channel assignment, back from the ground station indicating a channel is being made available and being assigned for the radio communication path;

training at least one modem of the moving object to be in communication with a ground station modem, the first ground station modem substantially simultaneously training itself to be in communication with a second ground station modem; and transmitting data to said ground station over said packet data network using an end-to-end transmission control protocol/internet protocol (TCP/IP) circuit.

18. A method of providing data communication services, comprising:

establishing a radio communication path, via a packet data network using circuit mode data, between a moving object and a ground station of the internet service provider using a data communication server and a satellite communication server co-located with the moving object, the data communications server including a plurality of interface units for accessing different data networks including an Ethernet interface unit, an ISDN interface unit, and a pre-determined wireless data network interface unit;

said step of establishing including:
sending a channel request signal, via the ISDN interface unit and a communication unit, to the ground station; and
receiving an acknowledgement signal via the ISDN interface unit and the communication unit, including a channel assignment, back from the ground station indicating a channel is being made available and being assigned for the radio communication path;

training at least one modem of the moving object to be in communication with a ground station modem, the first ground station modem substantially simultaneously training itself to be in communication with a second ground station modem; and transmitting data to said ground station over said packet data network using an end-to-end transmission control protocol/internet protocol (TCP/IP) circuit;

assigning a channel thread to the radio communication path, and assigning an IP address to an air station, interconnected to the data communication server, for the moving object;

recording the air station IP address assignment and channel thread assignment in a location table;

establishing an alternative radio communication path, initiating a hand-off, via the air station, with an alternative ground station, and subsequently terminating the radio communication path with the ground station, a new channel thread being assigned and the air station being assigned a new IP address that establishes the alternative radio communication path, the location table being updated with the new air station IP address and new channel thread assignment, and said alternative radio communication path being established in response to a pre-determined hand-off algorithm being satisfied; and said data packets to be routed from the ground station to the moving object being routed by looking up the current air station IP address from the location table and inserting this IP address into the packets.

19. The method of claim 18, wherein the pre-determined hand-off algorithm is a hand-off procedure selected from the group consisting of a hand-off being initiated when pre-determined distance and call time thresholds are satisfied, a hand-off being initiated when pre-determined distance and error rate thresholds are satisfied, a hand-off being initiated when pre-determined first distance, second distance, and call time thresholds are satisfied, and a hand-off being initiated when pre-determined call time, error rate, and distance thresholds are satisfied.

20. A method of providing wireless data communication services, comprising:

establishing a radio communication path, via a packet data network, between a moving object and a ground station using a data communication server and a radio communication unit co-located with the moving object, the data communication server including a plurality of interface units including an Ethernet interface unit, an ISDN interface unit, and a pre-determined wireless data network interface unit for accessing different data networks, the radio communication unit including a plurality of communication services for controlling a data link connection across the radio communication path including packet data seizure override and established packet data link override, and the ground station including radio channel services, including a radio data link layer having end-to-end error correction and packet sequencing, allowing multiple simultaneous packet data sessions and providing error rate measurements to the moving object for initiating a hand-off, for communicating with a terrestrial ground data gateway;

said step of establishing includes the steps of:

sending a channel request signal, via the ISDN interface unit and a communication unit, to the ground station; and receiving an acknowledgement signal via the ISDN interface unit and the communication unit, including a channel assignment, back from the ground station indicating a channel is being made available and being assigned for the radio communication path; and transmitting data to said ground station over said packet data network using a B-channel ISDN link, said data packets being IP packets encapsulated in a point-to-point protocol frame.

21. A system for providing communication services, comprising:

a data communication server, co-located with the moving object, for establishing a radio communication path between a moving object and a ground station including a plurality of interface units for accessing different data networks including an Ethernet interface unit, an ISDN interface unit, and a pre-determined wireless data network interface unit, the data communication server including software architecture including software functional layers, the layers including a system resources layer, a system services layer, an application programming interface layer, and an application layer, and the application programming interface layer including components representable by objects for providing communication services with each object including a communicator, a receptor, and service logic;

a radio communication unit, co-located with the moving object, including a plurality of communication services for controlling a data link connection across the radio communication path including packet data seizure override and established packet data link override;

the ground station including radio channel services, including a radio data link layer having end-to-end error correction and packet sequencing, allowing multiple simultaneous packet data sessions and providing error rate measurements to the moving object for initiating a hand-off, for communicating with a terrestrial ground data gateway.

* * * * *

UNITED STATES PATENT AND TRADEMARK OFFICE
CERTIFICATE OF CORRECTION

PATENT NO. : 7,020,708 B2  Page 1 of 1
APPLICATION NO. : 09/884730
DATED : March 28, 2006
INVENTOR(S) : Eric A. Nelson et al.

It is certified that error appears in the above-identified patent and that said Letters Patent is hereby corrected as shown below:

| Column | Line | |
|---|---|---|
| 15 | 42 | Change "perim-" to --peri- --. |
| 15 | 43 | Change "eter-based" to --meter-based--. |
| 18 | 25 | Change "being P packets" to --being IP packets--. |

Signed and Sealed this

Twelfth Day of December, 2006

JON W. DUDAS
*Director of the United States Patent and Trademark Office*